United States Patent [19]

Nakasuji

[11] Patent Number: 5,734,928
[45] Date of Patent: Mar. 31, 1998

[54] SYSTEM FOR SELECTING A KEY BY COMPARING THE KEY CODE DATA OF PREDETERMINED PRIORITY CORRESPONDING TO KEY INPUT FLAG OF SIMULTANEOUSLY PRESSED PLURALITY OF KEYS

[75] Inventor: Masataka Nakasuji, Nara, Japan

[73] Assignee: Sharp Kabushiki Kaisha, Osaka, Japan

[21] Appl. No.: 424,083

[22] Filed: Apr. 19, 1995

[30] Foreign Application Priority Data

Apr. 19, 1994 [JP] Japan ............................ 6-080066

[51] Int. Cl.⁶ .................................................. G06F 13/00
[52] U.S. Cl. .................................. 395/887; 364/709.16
[58] Field of Search ............................ 341/22, 23, 24, 341/26; 345/168; 364/709, 927.2, 928, 948.1

[56] References Cited

U.S. PATENT DOCUMENTS

| | | | |
|---|---|---|---|
| 3,900,845 | 8/1975 | Tsuiki et al. | 341/24 |
| 4,269,102 | 5/1981 | Kondo et al. | 84/655 |
| 4,293,849 | 10/1981 | Lacy | 341/24 |
| 4,804,278 | 2/1989 | Gotou et al. | 400/54 |
| 4,929,944 | 5/1990 | Nakajima | 341/24 |
| 5,210,853 | 5/1993 | Nakasuji et al. | 395/600 |
| 5,331,555 | 7/1994 | Hashimoto et al. | 364/419.07 |
| 5,371,498 | 12/1994 | Kwon et al. | 341/24 |
| 5,384,579 | 1/1995 | Nakasuji et al. | 345/123 |
| 5,424,730 | 6/1995 | Sasaki et al. | 341/25 |

FOREIGN PATENT DOCUMENTS 5-197468  8/1993  Japan.

*Primary Examiner*—Thomas C. Lee
*Assistant Examiner*—Anderson I. Chen

[57] ABSTRACT

A CPU outputs a signal from an output port group, and receives an input signal from input port group, whereby a pressed key of input key group is detected. When there are a plurality of keys which are pressed, CPU selects a key with priority based on valid key information in a ROM, and stores code data of the selected key in a key code portion. Consequently, only one of the plurality of keys pressed simultaneously is selected as an input key.

3 Claims, 22 Drawing Sheets

FIG.6

| PRIORITY | KEY CODE |
|---|---|
| 1 | KEY INFORMATION 1 (あ) CODE |
| 2 | KEY INFORMATION 2 (い) CODE |
| ⋮ | ⋮ |
| 15 | KEY INFORMATION 3 (か) CODE |
| 16 | KEY INFORMATION 4 (き) CODE |
| ⋮ | ⋮ |
| L-1 | KEY INFORMATION L-1 CODE |
| L | KEY INFORMATION L CODE |

85

SYSTEM FOR SELECTING A KEY BY COMPARING THE KEY CODE DATA OF PREDETERMINED PRIORITY CORRESPONDING TO KEY INPUT FLAG OF SIMULTANEOUSLY PRESSED PLURALITY OF KEYS

BACKGROUND OF THE INVENTION

1. Field of the Invention

The present invention relates to a key input apparatus used in an information processing apparatus such as a personal computer, a word processor, a portable electronic calculator, a cash register, a typewriter or the like. More specifically, the present invention relates to a technique for processing a key as an input key with priority, when there are a plurality of key inputs simultaneously.

2. Description of the Background Art

Conventionally, the problem of double pressing of keys has been addressed by some means or other in some equipments provided with a plurality of keys as an input apparatus, for example personal computers, word processors, portable electronic calculators, cash registers and typewriters. Here, the double pressing means pressing of two or more keys at the same time.

Japanese Patent Laying-Open No. 5-197468 discloses a key input method which is directed to a technique for addressing the problem of double pressing. According to this key input method, information related to a key pressed at a certain time point and information related to a key pressed at a next time point are detected. An exclusive OR of the information of the key pressed at the certain time period and the information of the key pressed at the next time point is obtained. Based on the result of this logic operation, the newly pressed key is selected, of the keys pressed at the next time. Accordingly, even when an input key which is to be pressed earlier and an input key which should be pressed next happen to be pressed simultaneously by an operator performing key input continuously at high speed, for example, the input key can be identified.

Further, some conventional equipments are adapted such that when a plurality of keys are pressed simultaneously, a different key code is allotted to the combination of the plurality of keys, and a processing corresponding to the different key code is performed. As the processing corresponding to the different key code, in many equipments, NOP processing (non operation) is allotted.

There are various causes of double pressing in various equipments having plurality of keys. For example, when the equipment is very small, as in the case of a so-called notebook type personal computer or a portable electronic calculator, the size of each key provided on the apparatus is very small. In some cases, the key might be smaller than the tip of the finger of the operator. In such a case, double pressing of key by the operator frequently occurs. Especially when the key is a panel key formed in the form of a panel on a prescribed plane and pressing thereof is realized by a simple touch of the finger of the operator, the frequency of double pressing is considerably high.

The key input method disclosed in the aforementioned laid open application has been proposed to address exclusively the double pressing during high speed continuous input. This method is not effective when applied to double pressing of a plurality of keys which is due to the small size of the keys mentioned above. The reason is that in such erroneous input, selection of a key based on the correspondence to the last key input does not have much significance.

In an equipment in which a separate key code is allotted based on the code of the plurality of keys in case of a double pressing and NOP processing takes place, efficiency in input operation will be decreased.

SUMMARY OF THE INVENTION

An object of the present invention is to provide a key input apparatus in which when a plurality of keys are erroneously pressed simultaneously, any of the keys is processed as the input key with priority.

The key input apparatus in accordance with an aspect of the present invention includes a keyboard provided with a plurality of keys; a key input detecting unit for detecting a key, which is pressed, of the plurality of keys; a plural key input detecting unit for detecting, based on the result of detection by the key input detecting unit, pressing of two or more of the plurality of keys; a key priority storing unit for storing priority determined in advanced for each of the plurality of keys; and a key selecting unit referring to the priority stored in the key priority storing unit, for selecting one of the two or more keys detected by the plural key input detecting unit, as the pressed key.

In the above described structure, when two or more keys are pressed simultaneously on a keyboard having a plurality of keys, priority of keys determined in advance is referred to, and one of the two or more keys pressed is selected as the pressed key. Therefore, even when two or more keys are pressed simultaneously, it is possible to process the key input assuming that only one of the key is pressed, and therefore efficiency in operation of the apparatus can be improved.

According to another aspect of the present invention, the key input apparatus includes a keyboard provided with a plurality of keys; a data memory for storing prescribed data for each of the keys pressed, when two or more of the plurality of keys are pressed simultaneously; a key selecting unit for selecting one of the two or more keys pressed simultaneously, based on the data stored in the data memory; and process executing unit for executing a prescribed processing, in accordance with the key selected by the key selecting unit.

By this structure, when two or more keys are pressed simultaneously on a keyboard including a plurality of keys, only one key is selected and the processing corresponding to said one key is executed. Therefore, processing corresponding to one of the plurality of keys input simultaneously is executed without fail, and not all the inputs of the keys are invalidated, so that efficiency in operation of the apparatus can be improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an illustration showing structure of valid key information.

DESCRIPTION OF THE PREFERRED EMBODIMENTS

One embodiment of the key input apparatus of the present invention will be described in the following with reference to the figures.

The first embodiment of the present invention will be described with reference to FIG. 1 to 13.

Figure 1:
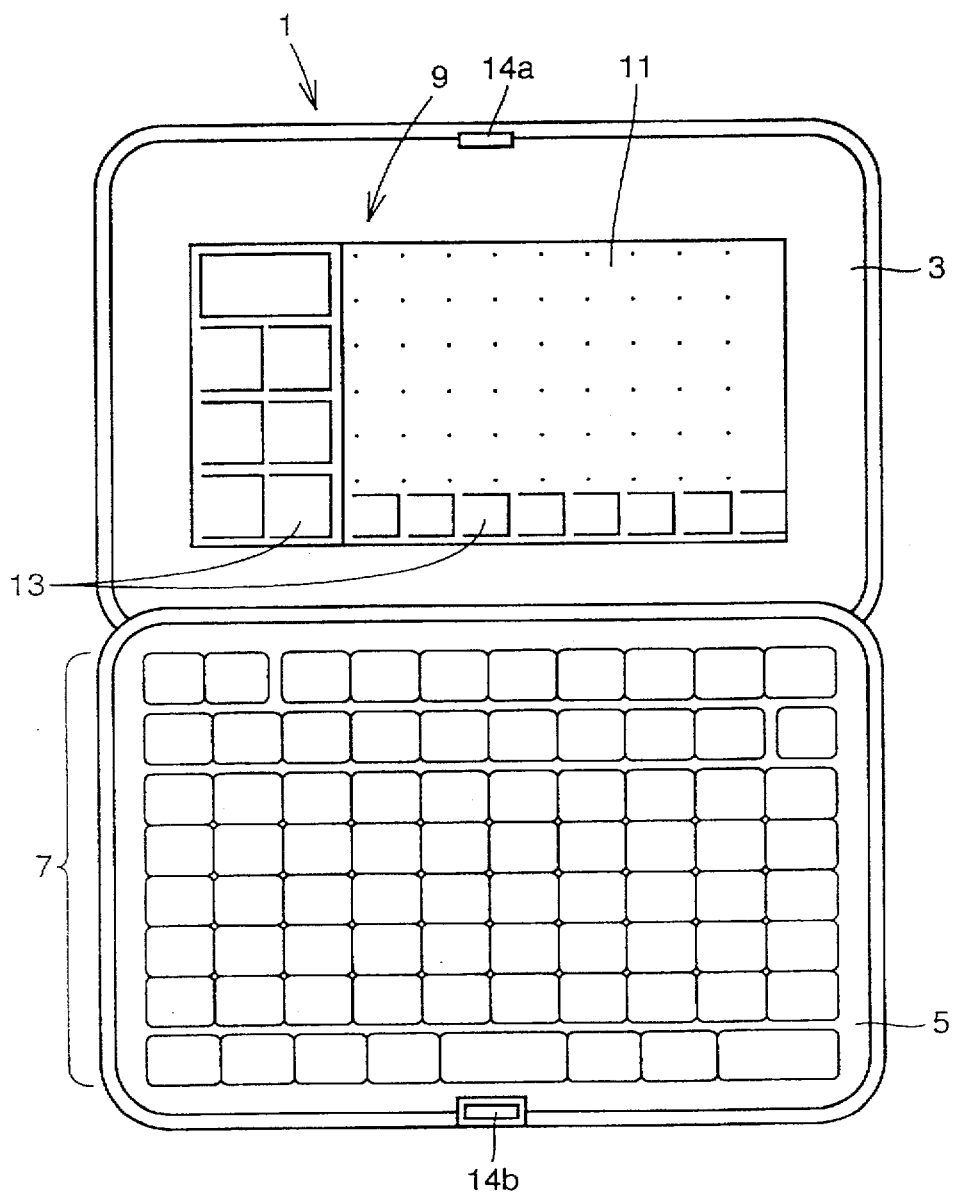
FIG. 1 is a plan view showing an appearance of a portable information processing apparatus in accordance with a first embodiment of the key input apparatus of the present invention.

FIG. 1 is a plan view showing the appearance of a portable information processing apparatus (hereinafter simply referred to as an "apparatus") 1 in accordance with the first embodiment of the key input apparatus of the present invention. Apparatus 1 consists of an upper housing 3 and a lower housing 5. A display portion 9 including LCDs (Liquid Crystal Displays) is provided in the upper housing 3. An input key group 7 for inputting operator command and data such as characters to apparatus 1 by the operator is provided in the lower housing 5. Display portion 9 includes a data display area 11 for displaying the data input by the operator through input key group 7, data processed by apparatus 1, message generated from apparatus 1 and so on, and a display panel key area 13 allowing selection of an operation mode of apparatus 1 by the operator.

The keys included in input key group 7 and keys included in display panel key area 13 are of touch panel type which are adapted to detect the key which is touched by the finger of the operator, as the pressed key. However, the keys included in display panel key area 13 is displayed only while display portion 9 is providing display output. Keys of the input key group 7 are permanent keys formed of resin or the like, provided on an upper surface of lower housing 5.

FIG. 1 shows an example of a state of apparatus 1 during operation. The junction between upper and lower housings 3 and 5 is coupled by a hinge. Upper housing 3 is rotatable about the hinge within a prescribed range, with respect to the lower housing 5. By putting upper housing 3 on the upper surface of lower housing 5 like a lid, and by engaging portions 14a and 14b provided at upper and lower housings 3 and 5 with each other, apparatus 1 can be closed, allowing easy transportation or accommodation.

Figure 2:
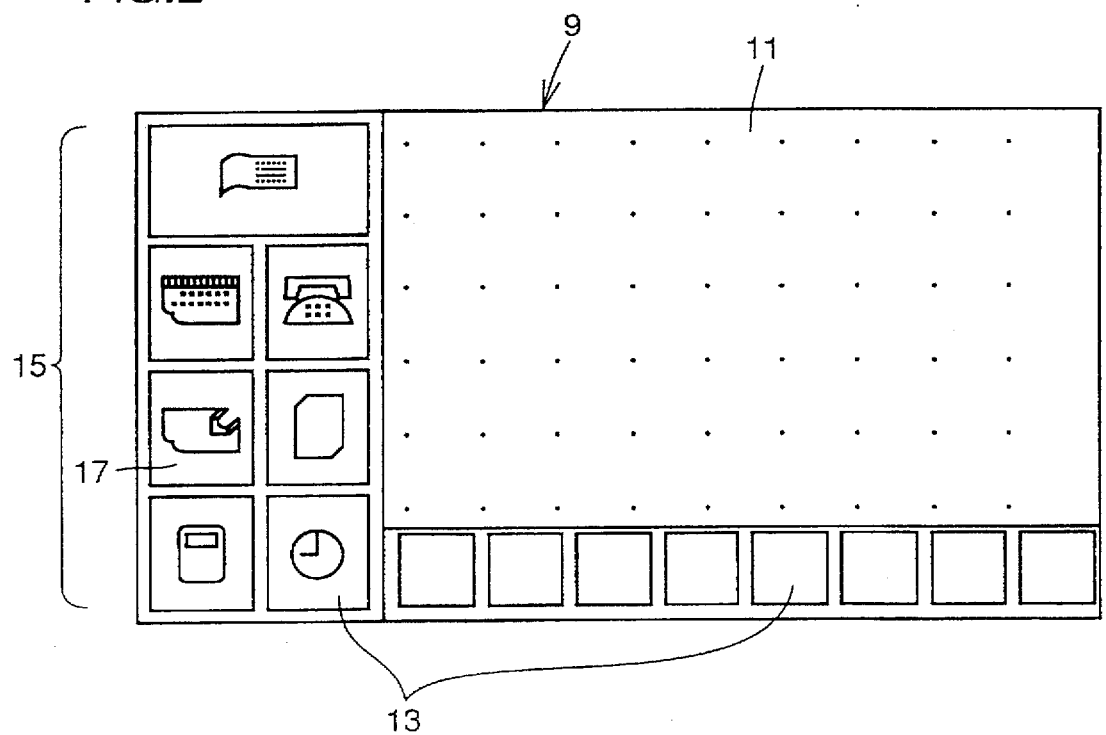
FIG. 2 is a plan view showing a display portion of the information processing apparatus.

FIG. 2 shows detail of display portion 9. In display panel key area 13 of display portion 9, a mode setting key group 15 for selecting various functions executed by apparatus 1 is displayed. By selecting and pressing a key included in mode setting key group 15, a function corresponding to the pressed key is executed.

The function of apparatus 1 includes the following. The first function is display of a calendar (hereinafter simply referred to as a "calendar"). The second function is to input and edit schedule data (hereinafter simply referred to as "schedule"). The third function is to input and edit data of a plurality of addresses, telephone numbers and so on (hereinafter, simply referred to as "address book"). The fourth function is to input and edit memo data (hereinafter simply referred to as "memo"). The fifth function is to calculate, based on input numerical data (hereinafter simply referred to as "calculation"). The sixth function is to display time (hereinafter simply referred to as "clock").

Mode setting key group 15 includes a memo mode key 17. Memo mode key 17 is for executing the aforementioned "memo". In this embodiment, structure of the key input apparatus will be described referring to the input of memo data when the memo mode key 17 is pressed, as an example.

Figure 3:
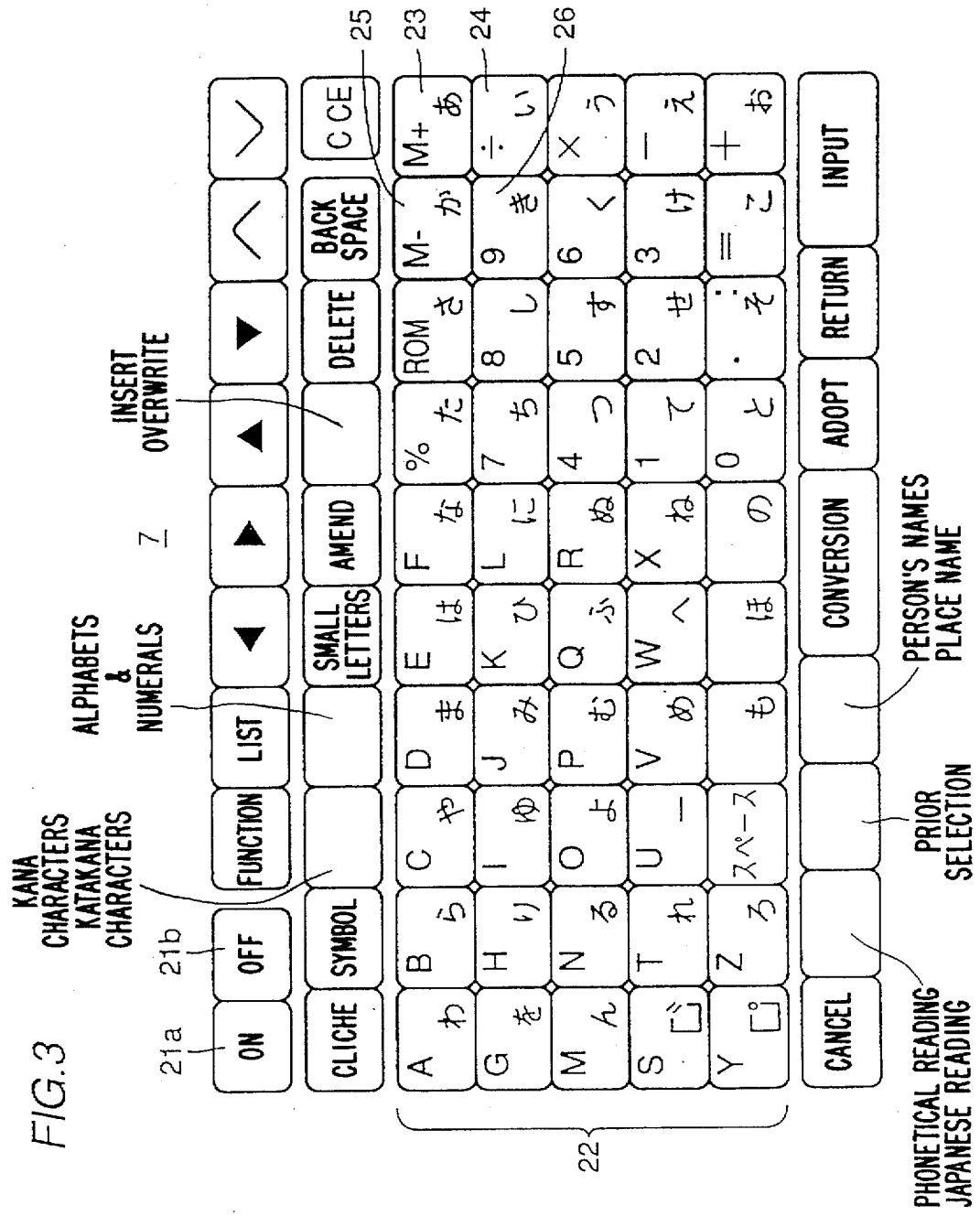
FIG. 3 is a plan view showing an input key portion of the information processing apparatus.

FIG. 3 is a plan view showing details of the input key group 7. Input key group 7 includes a power ON key 21a for turning on apparatus 1, and a power OFF key 21b for turning off apparatus 1. Further, input key group 7 includes character input keys 22 for the operator to input character information when each of the aforementioned function is to be executed. The data input through character input key 22 includes Japanese characters, Chinese characters, alphabets, various symbols and numerical information.

Character input key 22 includes a character information 1 input key 23 for inputting a Japanese character corresponding to "A"; a character information 2 input key 24 for inputting a Japanese character corresponding to "I"; a character information 3 input key 25 for inputting a Japanese character corresponding to "KA"; and a character information 4 input key 26 for inputting a Japanese character corresponding to "KI". In the following, operation when these four input keys 23 to 26 are simultaneously pressed (touched) will be described as an example.

Figure 4:
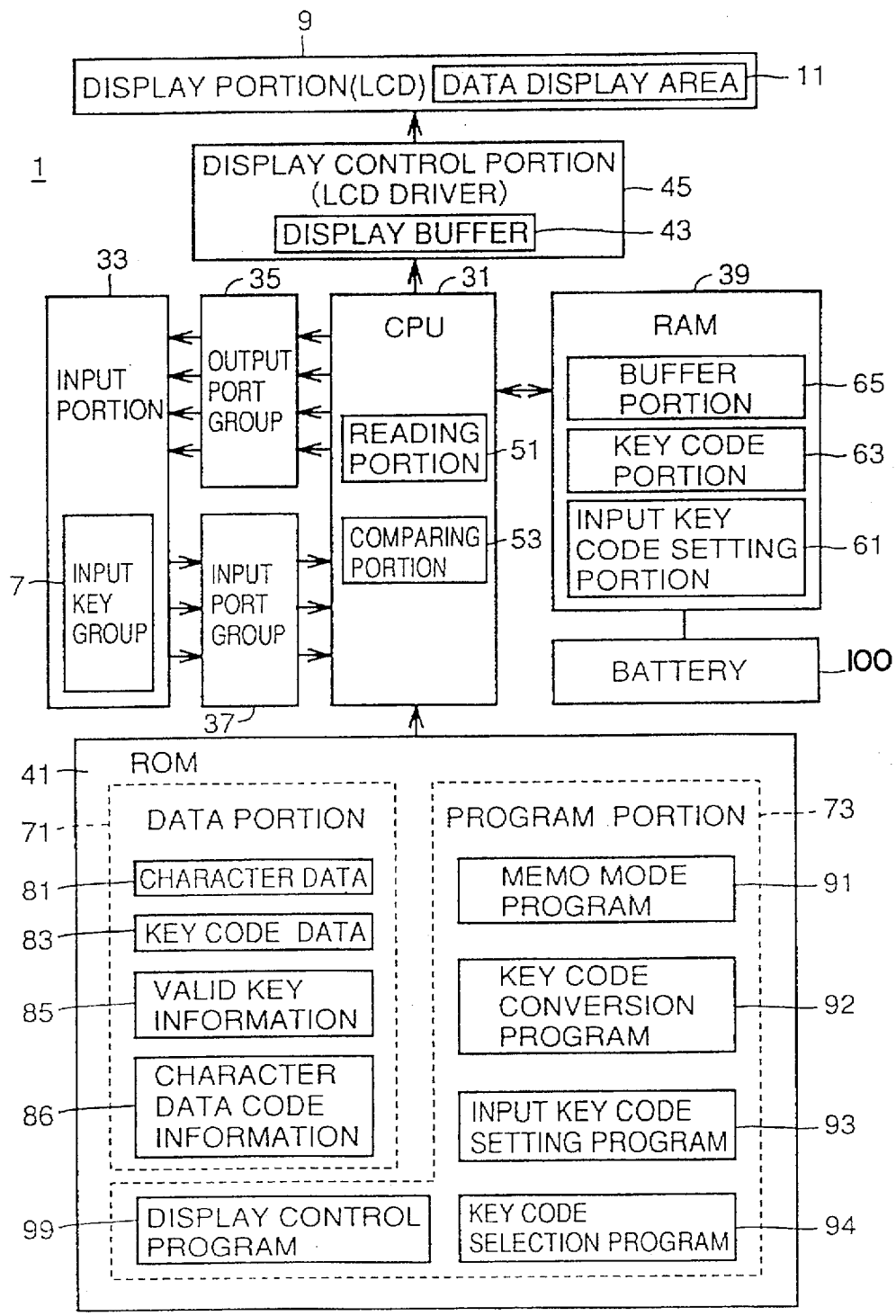
FIG. 4 is a block diagram showing functional structure of the information processing apparatus.

FIG. 4 is a functional block diagram of apparatus 1. Apparatus 1 includes a CPU1, an input portion 33 including input key group 7, an output port group 35 which is a group of a plurality of output ports for providing signals from CPU 31 to input portion 33, and an input port group 37 which is a group of a plurality of input ports for inputting signals from input portion 33 to CPU 31.

Further, apparatus 1 includes RAM (Random Access Memory) 39 for temporarily storing various data, and an ROM (Read Only Memory) 41 for storing in advance data necessary for executing various functions and key input processing of the apparatus 1. RAM 39 is backed up by a battery 100, and therefore stored content can be maintained even when the power of apparatus 1 is OFF.

Further, apparatus 1 includes display portion 9 (see FIG. 1) including data display area 11, and a display control portion (LCD driver) 45 including a display buffer 43 for temporarily storing data to be displayed on data display area 11.

CPU 31 will be described. CPU 31 includes a reading portion 51 and a comparing portion 53 therein. Reading portion 51 reads data stored in advance in ROM 41 and data stored in RAM 39 from ROM 41 and RAM 39, respectively. Comparing portion 53 compares various data based on a program which has been executed at that time.

Content stored in RAM 39 will be described. RAM 39 includes, as a storage area, an input key code setting portion 61, a key code portion 63 and a buffer portion 65. Input key code setting portion 61 is for temporarily storing key code data of all the keys pressed simultaneously, of the plurality of keys included in input key group 7. Key code portion 63 is for storing code data of a key selected as the input key in accordance with various program processings which will be described later, from the plurality of key codes stored in input key code setting portion 61. Buffer portion 65 is for temporarily storing character data corresponding to the key codes stored in key code portion 63.

The content stored in ROM 41 will be described. ROM 41 includes a data portion 71 and a program portion 73.

Data portion 71 includes a character data 81, a key code data 83, a valid key information 85 and a character data code information 86. Character data 81 is a set of dot data of characters. When a key code stored in key code portion 63 of RAM 39 is a code indicative of character information, CPU 31 reads and stores in buffer portion 65 the character data code corresponding to the key code, from character data code information 86. Then, CPU 31 reads the character data code from buffer portion 65, reads dot data corresponding to the code data, and outputs the same to display buffer 43 of display control portion 45. Thereafter, display control portion 45 controls driving of display portions 9 based on the dot data stored in display buffer 43, and character image corresponding to the key code stored in key code portion 63 is displayed on data display area 11.

Character data code information 86 contains code data corresponding to each 1 data of character data 81. For example, it contains ASCII code, JIS code or the like.

Key code data 83 refers to code data of a key specified by a combination of an output port included in output port group 35 and an input port included in input port group 37. CPU 31 provides a signal to output port group 35, and based on a result of the signal which has been transmitted back from input port group 7 through input portion 33, specifies the key position which is pressed. CPU 31 obtains the code data of the key corresponding to the pressed portion, referring to key code data 83.

Valid key information 85 is the data determining priority of each key included in input key group 7. When a plurality of keys are pressed simultaneously in input key group 7, CPU 31 reads priority of each of the pressed keys, referring to valid key information 85. CPU 31 selects that key which has the highest priority of the input plurality of keys, and processes assuming that only the selected key has been input. The structure of valid key information 85 will be described later.

Program portion 73 includes various programs to be executed by apparatus 1. The program includes a memo mode program 91, a key code conversion program 92, an input key code setting program 93, a key code selecting program 94, and a display control program 99.

Memo mode program 91 is an application program executed when there is a memo mode key 7 input (see FIG. 2). Apparatus 1 includes, as executable functions, calendar, schedular and so on in addition to "memo". Application programs corresponding to these functions are also contained in program portion 73. However, they are not shown in the figure, as these programs are not of interest in the following description.

Key code conversion program 92, input key code setting program 93 and key code selecting program 94 are programs for key input operations in apparatus 1. Details of these programs will be described later.

Display control program 99 is for controlling display of data corresponding to key codes stored in key code portion 63 and so on by CPU 31 on data display area 11 of display portion 9.

Display portion 9 will be described. Display portion 9 includes, for example, an LCD of a dot matrix type. CPU 31 reads dot data stored in buffer portion 65 of RAM 39 based on display control program 99, outputs the same to display buffer 43, and provides a display instruction signal to display control portion 45. Display control portion 45 displays dot data in display buffer 43 on dot data display area 11 of display portion 9, in response to the display instruction signal.

Detailed structures of input portion 33, output port group 35 and input port group 37 will be described with reference to FIG. 5. In this embodiment, input key group 7 having M×N=L keys arranged in a matrix of M rows in the longitudinal direction and N columns in the lateral direction of FIG. 3, will be described as an example.

Figure 5:
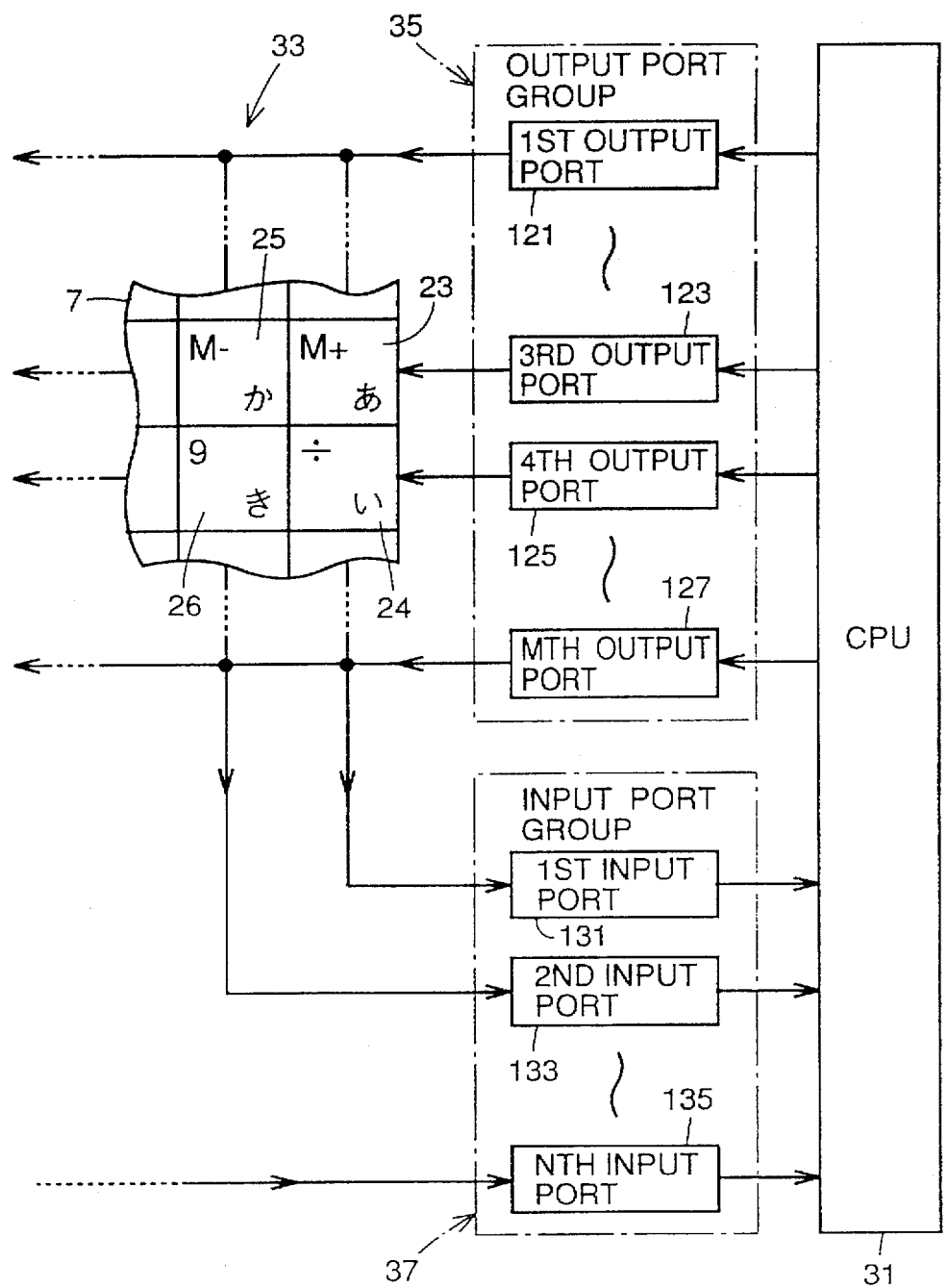
FIG. 5 is a schematic diagram showing details of the input portion, an output port group and an input port group.

Referring to FIG. 5, output port group 35 includes first to Mth output ports 121 to 127 corresponding to the number of rows of the keys in input key group 7. Input key group 37 includes first to Nth input ports 131 to 135 corresponding to the number of columns of input key group 7. To the first to Mth output ports 21 to 127, signal lines in the lateral direction of FIG. 5 at input portion 33 are connected. To the first to Nth input ports 131 to 135, signal lines in the longitudinal direction of FIG. 5 at input portion 33 are connected.

At input portion 33, signal lines in the lateral direction connected to output port group 35 and signal lines in the longitudinal direction connected to input port group 37 are arranged in a shape of a grid. Each key included in input key group 7 is formed at a corresponding position of an intersection of the grid. FIG. 5 shows, as an example, structures of input keys 23 to 26 of character informations 1 to 4, for inputting Japanese characters which correspond to "A", "I", "KA", and "KI".

When a key included in input key group 7 is pressed, the signal line in the lateral direction and the signal line in the longitudinal direction are electrically connected at an intersection of the grid corresponding to the key. For example, when input key 23 of character information 1(A) is pressed, the signal line connected to the third output port 123 and the signal line connected to the first input port 131 are electrically connected.

CPU 31 detects which key of input key group 7 is pressed, in the following manner. CPU 31 successively provides signals in accordance with a prescribed order and at different timings, from the first to Mth output ports 121 to 127. Every time a signal is output from each output port, CPU 31 studies the state of input of signals from the first to Nth input ports 131 to 135. If any of the key has been pressed, a signal is input to the CPU 31 from the input port corresponding to the pressed key, when CPU 31 outputs a signal from the output portion corresponding to the pressed key. CPU 31 detects the position of the pressed key in this manner. This detection will be hereinafter referred to as key scan detection.

FIG. 6 is an illustration showing a structure of valid key information 85 stored in data portion 71 of ROM 41. Valid key information 85 stores key codes corresponding to each of M×N=L keys included in input key group 7, starting from the one having the highest priority. Priority data is stored corresponding to each key code. CPU 31 obtains the priority of the key code, using the corresponding key code as reference data.

Referring to the figure, key information 1 code corresponding to input key 23 of character information 1, that is, Japanese character corresponding to "A" has the highest priority among the input key group 7. The key code having second highest priority is the key code corresponding to input key 24 for character information 2, that is, Japanese character "I". Key codes corresponding to input keys 25 and 26 for character information 3 and 4, that is, Japanese characters corresponding to "KA" and "KI" have 15th and 16th priorities, respectively.

Figure 7:
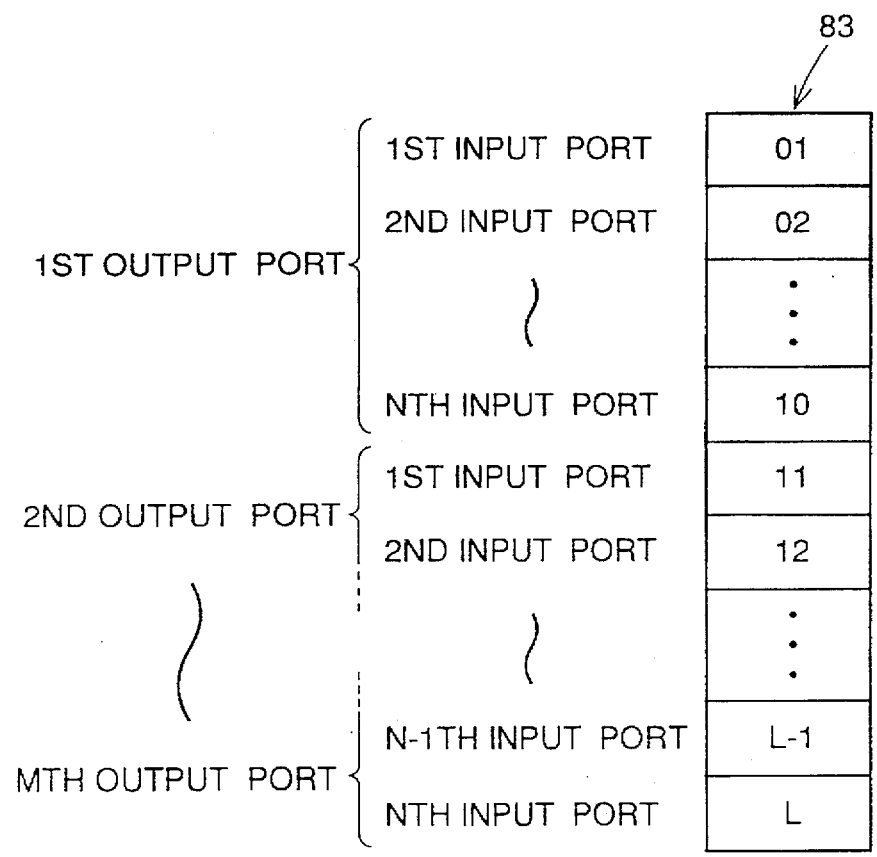
FIG. 7 is an illustration showing a structure of key code data.

FIG. 7 shows a structure of key code data 83 stored in data portion 71 of ROM 41. Key code data 83 stores key codes corresponding to combinations of each of the first to Mth output ports and each of the first to Nth input ports, in accordance with a prescribed order. FIG. 7 shows an example of the arrangement. CPU 31 retrieves, as a result of key scan detection described with reference to FIG. 5, the combination of the input port and the output port at which there is a signal input, in key code data 83, thus obtaining code data of the pressed key.

For example, when a signal is output from the first output port 121 and a signal is input from the first input port 131, the data at the head of the key code data 83 is referred, and the data of key code "01" is obtained. When a signal is output from the second output port 123 and a signal is input from second input port 133, then data of the key code "12" is obtained.

The key input operation of apparatus 1 will be described with reference to FIGS. 8 to 13.

Figure 8:
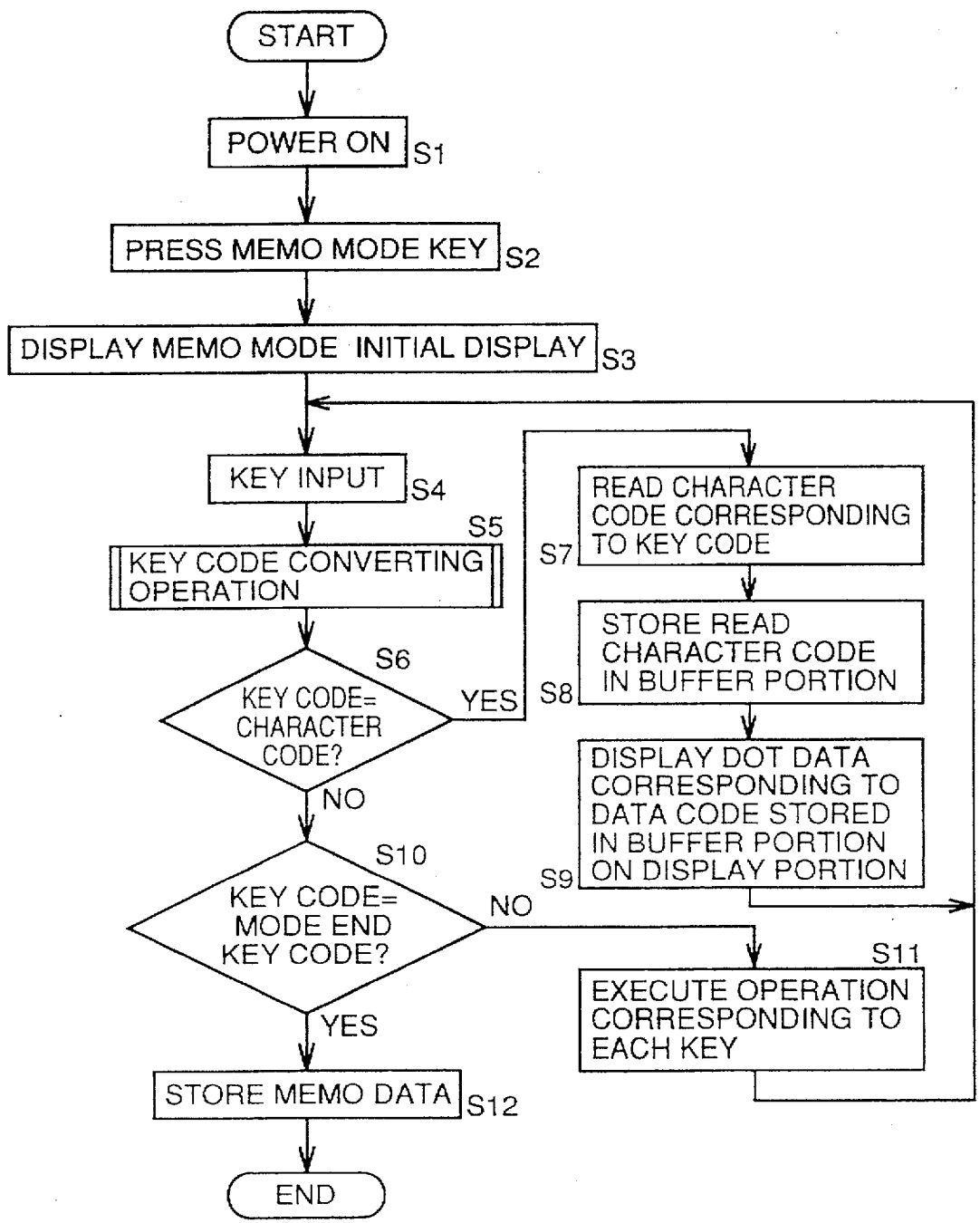
FIG. 8 is a flow chart showing the processing in a memo mode in the information processing apparatus.
Figure 9A:
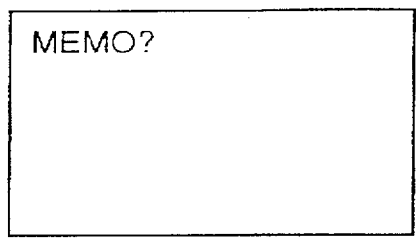
FIG. 9(a) and (b) is a schematic illustration showing displays on the screen when memo mode is being executed.

FIG. 8 is a flow chart showing the processing when memo mode is executed in apparatus 1. When an operator presses power ON key 21a (see FIG. 3) (S1), data display area 11 and display panel key area 13 are displayed on display portion 9. When the operator presses memo mode key 17 (see FIG. 2) (S2), CPU 31 activates memo mode program 91 in ROM 41. By the execution of memo mode program 91, a memo mode initial display such as shown in FIG. 9(a) is displayed on data display area 11 of display portion 9 (S3).

In order to input memo data in accordance with the message "memo?" displayed on memo mode initial display, the operator successively presses any of the keys in input key group 7 (see FIG. 3) (S4). When any of the keys is pressed by the operator, CPU 31 performs key code converting operation, by activating key code converting program 92 (S5). By the key code converting operation, CPU 31 obtains a key code corresponding to the pressed key. Details of the key code converting operation will be described layer.

Thereafter, CPU 31 determines whether or not the obtained key code is a code corresponding to character information (S6). If the key code is a code indicative of character information (YES in S6), CPU 31 reads a character data code corresponding to the key code stored in key code portion 63, from character data code information 86 (S7). Then, CPU 31 stores the read data code in buffer portion 65 (S8). Thereafter, CPU 31 reads the dot data corresponding to the character data code stored in buffer portion 65 from character data 81, and outputs the dot data together with display instruction signal, to display control portion 45. Thus dot data is displayed on display portion 9 (S9). These operations of S7 to S9 are carried out in accordance with the display control program 99 of ROM 41 by CPU 31.

Figure 9B:
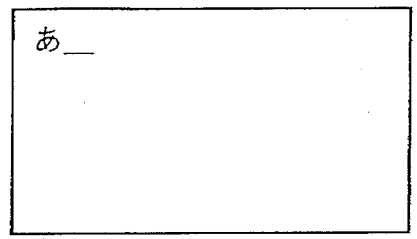

A state in which dot data (character image) corresponding to the input key is displayed on data display area 11 of display portion 9 is shown in FIG. 9(b). This figure corresponds to an example in which input key 23 of character information 1 (Japanese character corresponding to "A") is pressed and character image of "A"in Japanese character corresponding to the input key 23 is displayed.

Meanwhile, if the key code is not a code representing a character information in S6 (NO in S6), CPU 31 determines whether or not the key code is a code of a mode end key (S10). If the key code is not the mode end key code (NO in S10), CPU 31 executes an operation corresponding to each key represented by the key code (S11). Here, the operation corresponding to each key means operation designated by a key other than the character information input keys of input key group 7. For example, it includes operations executed when "delete" key, "back space" key or "conversion" key is pressed. When execution corresponding to the pressed key is completed, the flow again waits for another input (S4).

If it is the code of the mode end key in S10 (YES in S10), CPU 31 stores memo data input by that time in memo data storing area (not shown) (S12), and terminates memo mode.

Figure 10:
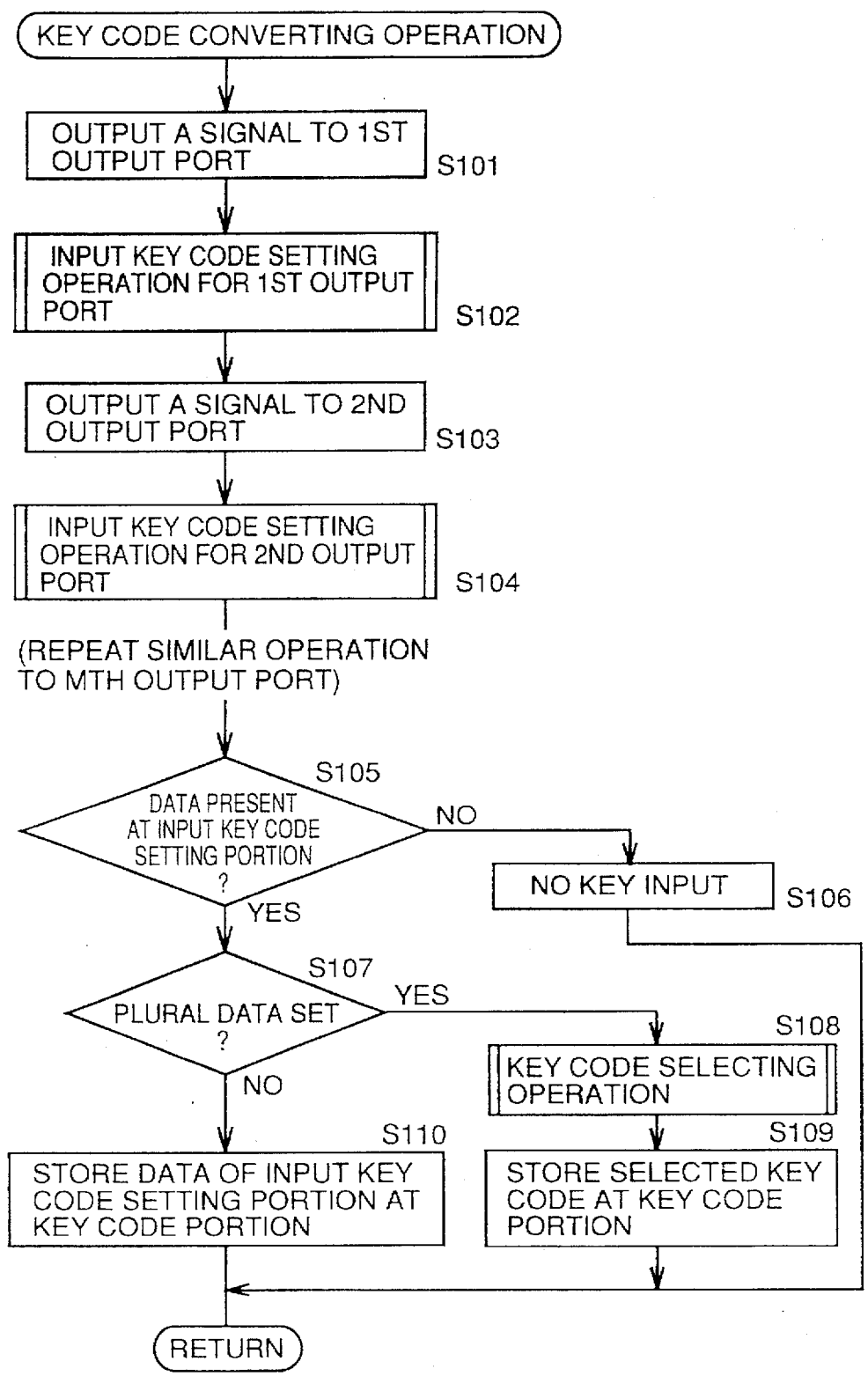
FIG. 10 is a flow chart showing the processing in key code converting operation.

FIG. 10 is a flow chart showing processing of key code converting operation. When key code converting program 92 is activated, CPU 31 provides a signal to a first output port 121 (see FIG. 5) (S101). Thereafter, CPU 31 performs input key code setting operation, based on the state of input of first to Nth input ports 131 to 135 with respect to a signal output to the first output port 121 (S102). The input key code setting operation is the operation described above, in which position of a pressed key is found based on the state of signal input from the input port, the key code corresponding to the key is found by referring to key code data 83 (see FIG. 7), and the found key code is stored in input key code setting portion 61. Details of the input key code setting operation will be described later.

When input key code setting operation for the first output port 121 ends, CPU 31 successively output a signal to the second output port (S103), and based on the state of signal input from the first to Nth input port 131 to 135 with respect to the signal output to the second output port, performs input key code setting operation (S104). Thereafter, CPU 31 successively repeats the operations of S103 and S104 for the third output port 123 to the Mth output port 127.

When input key code setting operation is completed, code data of all the keys pressed at the time of key scan detection is set in input key code setting portion 61 of RAM 39. CPU 31 determines whether or not there is data in input key code setting portion 61 (S105). If there is no data in input key code setting portion 61 (NO in S105), CPU 31 determines that there is not a key input (S106), and terminates the program.

If there is data in input key code setting portion (YES in S105), CPU 31 determines whether or not the set data is in plural (S107). If there are a plurality of data set therein (YES in S107), CPU 31 performs key code selecting operation (S108). The key code selecting operation is for selecting code of any key as the code data of an input key, from code data of a plurality of keys set in input key code setting portion 61. By this operation, when a plurality of keys of input key group 7 are pressed simultaneously, one of the plurality of keys is selected. Subsequently, the operation proceeds assuming that the selected key only has been pressed. Details of the key code selecting operation will be described later. CPU 31 stores the key code selected by the key code selecting operation in key code portion 63 (see FIG. 4) (S109).

Meanwhile, if there is only one data set in input key code setting portion (NO in S107), CPU 31 stores the set key code data in key code portion 63 (S110). When storage of key code data in key code portion 63 is completed by the operation in step S109 or S110, CPU 31 terminates the program.

Figure 11:
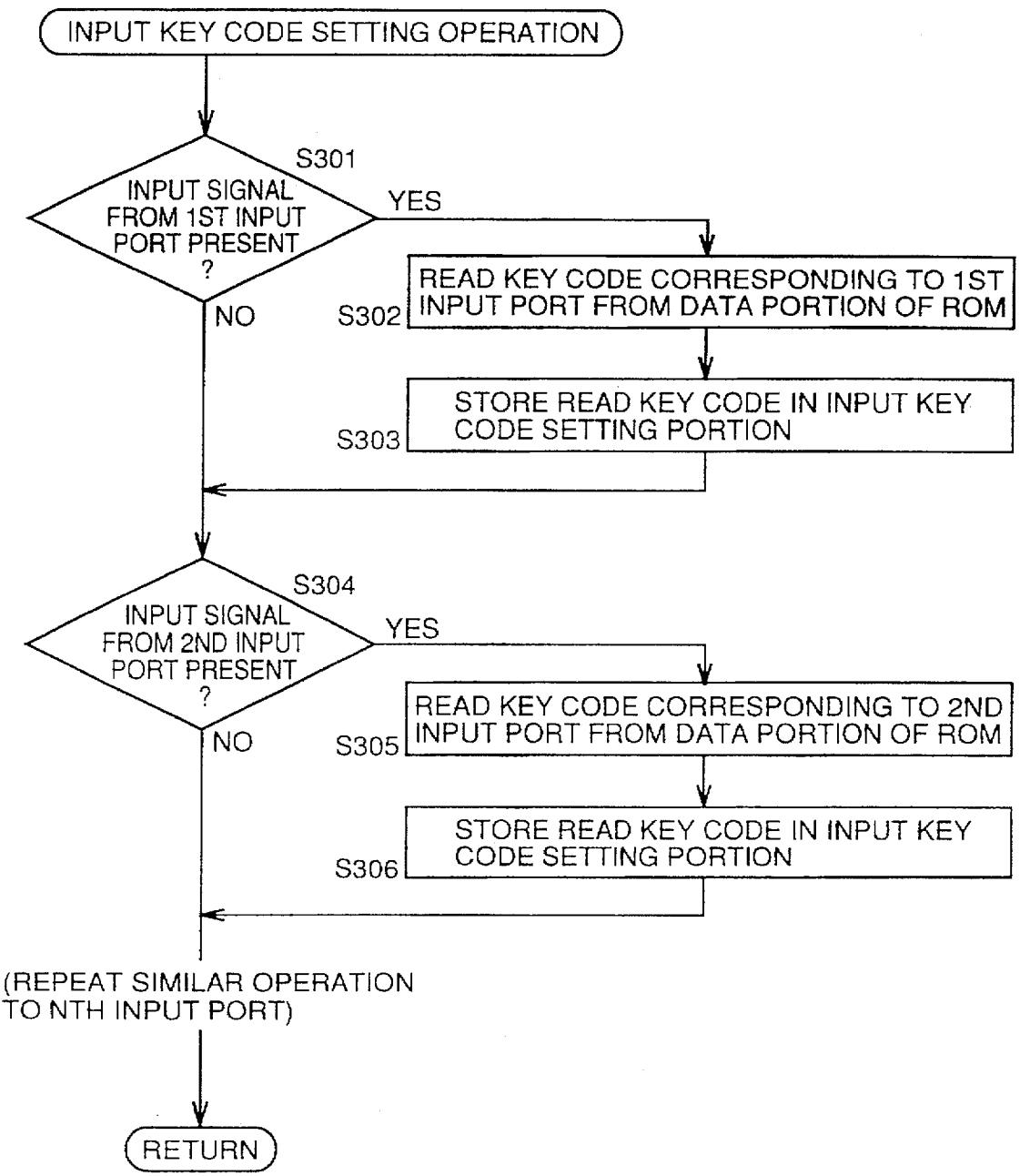
FIG. 11 is a flow chart showing processing in an input key code setting operation.

FIG. 11 is a flow chart showing the processing of input key code setting operation.

The flow of this figure shows details of steps S102 and S104 of FIG. 10, and it is executed by the activation of input key code setting program 93 (see FIG. 4). Every time CPU 31 provides a signal output to each of the first to Mth output ports 121 to 127 for key scan detection, the CPU 31 activates the input key code setting program 93.

When input key code setting program 93 is activated, CPU 31 determines whether or not there is an input signal from the first input port 131 (S301). When there is an input signal from the first input port (YES in S301), CPU 31 reads the corresponding key code from the key code data 83 included in data portion 71 of ROM 41 (see FIG. 7) to reading portion 51 (S302). The corresponding key code here means the key code corresponding to the combination of the output port, to which a signal is output when the input key code setting process takes place, and the first input port 131. For example, when input key code setting process is executed in S102 of FIG. 10, the corresponding key code in step S302 means the code data of "01" which corresponds to electrical connection between the first output port 121 and the first input port 131, from FIG. 7.

Then, CPU 31 stores the key code which has been read out to the reading portion 51 in input key code setting portion 61 (S303). Then, the flow proceeds to S304 in which CPU 31 performs operation related to the second input port.

Meanwhile, when there is no input signal from the first input port 121 (NO in S301), CPU 31 directly proceeds to the step S304, and performs operation related to the second input port.

CPU 31 determines whether or not there is an input signal from the second input port (S304). If there is an input signal from the second input port (YES in S304), CPU 31 reads the key code corresponding to the second input port from the key code data 83 of ROM 41 to the reading portion 51, as in step S302 (S305). Thereafter, CPU 31 stores the key code which has been read out to reading portion 51 to input key code setting portion 61 (S306). Thereafter, CPU 31 performs operation related to the third input port.

When there is not an input signal from the second input port (NO in S304), CPU 31 performs operation related to the third input port directly.

CPU 31 repeats the operations of steps S304 to S306 for the third to Nth input ports, and terminates the program.

Consequently, codes of all the keys pressed of input key group 7 are stored in input key code setting portion 61.

Figure 12:
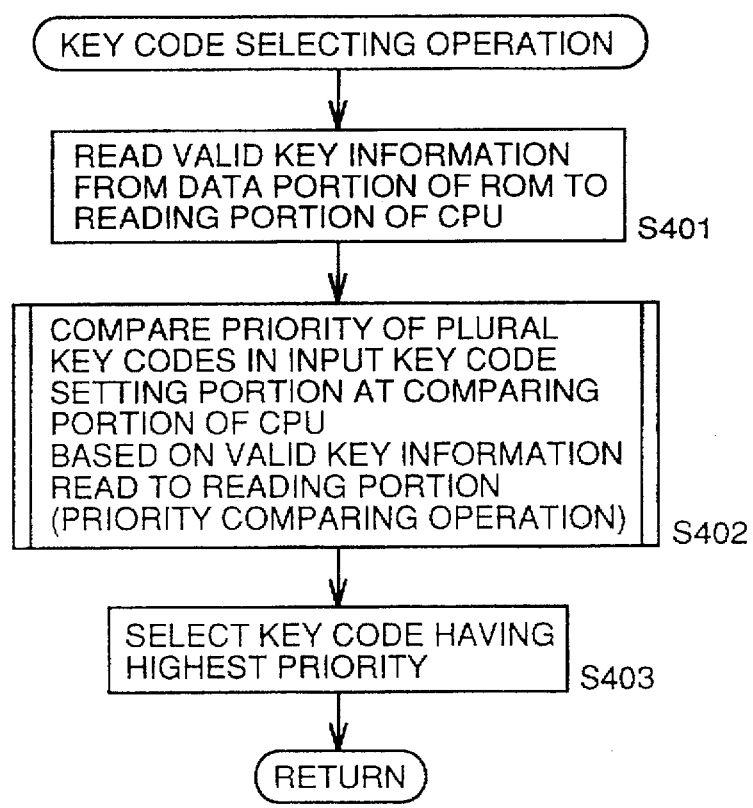
FIG. 12 is a flow chart showing the processing in a key code selecting operation.

FIG. 12 is a flow chart showing the processing of key code selecting operation. The flow of this figure shows details of the step S108 of FIG. 10, and it is executed by activation of key code selecting program 94 (see FIG. 4). When it is determined in step S107 of FIG. 10 that there are a plurality of data set in input key code setting portion (YES in S107), CPU 31 activates key code selecting program 94.

When key code selecting program 94 is activated, CPU 31 reads valid key information 85 included in data portion 71 of ROM 41 to reading portion 51 (S401). Based on the content of valid key information (see FIG. 6) read out to reading portion 51, CPU 31 compares priority of a plurality of key codes in input key code setting portion 61 at comparing portion 53 (S402). The operation of comparing priorities of the plurality of key codes is referred to as priority comparing operation. Details of the priority comparing operation will be described later. Then, CPU 31 selects a key code having the highest priority found through the priority comparing operation as the selected key code (S403), and terminates the program.

Figures 13, 14:
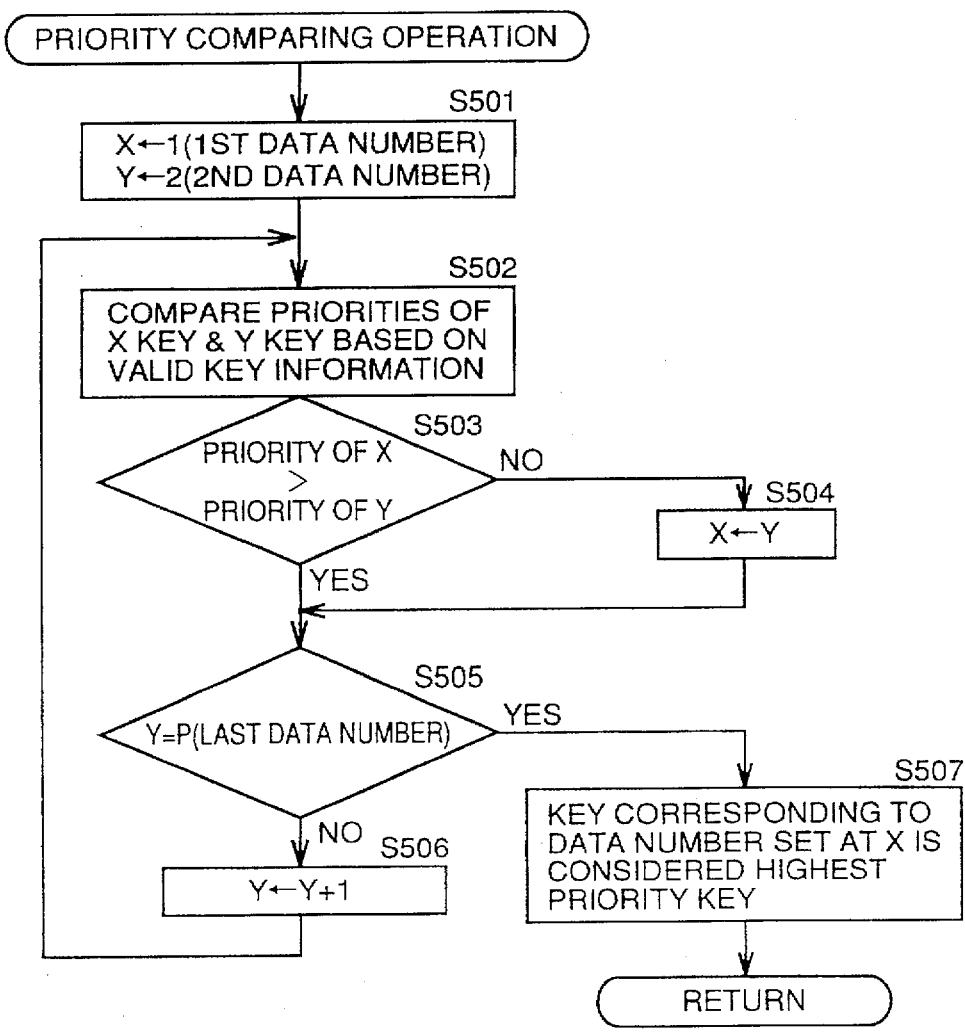
FIG. 13 is a flow chart showing the processing in priority comparing operation.
FIG. 14 is an illustration showing an example of set states of an input key code setting portion.

FIG. 13 is a flow chart showing the processing of priority comparing operation. The processing of this flow is the details of the step S402 of FIG. 12. FIG. 14 is an illustration showing an example of the state set in input key code setting portion 61. In input key code setting portion 61, key code data set as shown in the figure are stored such that relative addresses of respective data correspond to the data numbers.

Referring to FIG. 13, when priority comparing operation starts, CPU 31 sets data numbers 1 and 2 of key code data at two variables X and Y (S501). Then, CPU 31 finds priorities of the key codes corresponding to the data numbers set at variables X and Y, referring to valid key information 85 (S502). When the priority of the key code having the data number set in variable X is not larger than the priority of the key code corresponding to the data number set in variable Y (NO in S503), CPU 31 sets the data number set in variable Y at the variable X (S504). Meanwhile, if the priority of the key code corresponding to the data number set in variable X is higher than the priority of the key code corresponding to the data number of variable Y (YES in S503), CPU 31 simply proceeds to the next operation.

Thereafter, CPU 31 determines whether or not the data set in variable Y is the last data (S505). If the data of variable Y is not the last data (NO in S505), CPU 31 increments by 1 the data number set in variable Y (S506), and repeats the operation from the step S502. By repeating the operations of steps S502 to S506, the data number of the key code having the highest priority at the time point is set in variable X. Priority of a key code corresponding to the data number set in variable Y with respect to the key code corresponding to the data number of variable X is compared successively.

If the data number set in variable Y is the last data number in S505 (YES in S505), CPU 31 terminates comparing operation. The key code corresponding to the data number set in variable X at the time point is selected as the key code of highest priority (S507), and thus priority comparing operation terminates.

As described above, by the information processing apparatus 1 in accordance with the present embodiment, even when a plurality of keys included in input key group 7 are pressed simultaneously, process proceeds assuming that only one key has been pressed, based on the priority of validity of respective keys stored in advance in valid key information 85.

Figure 15:
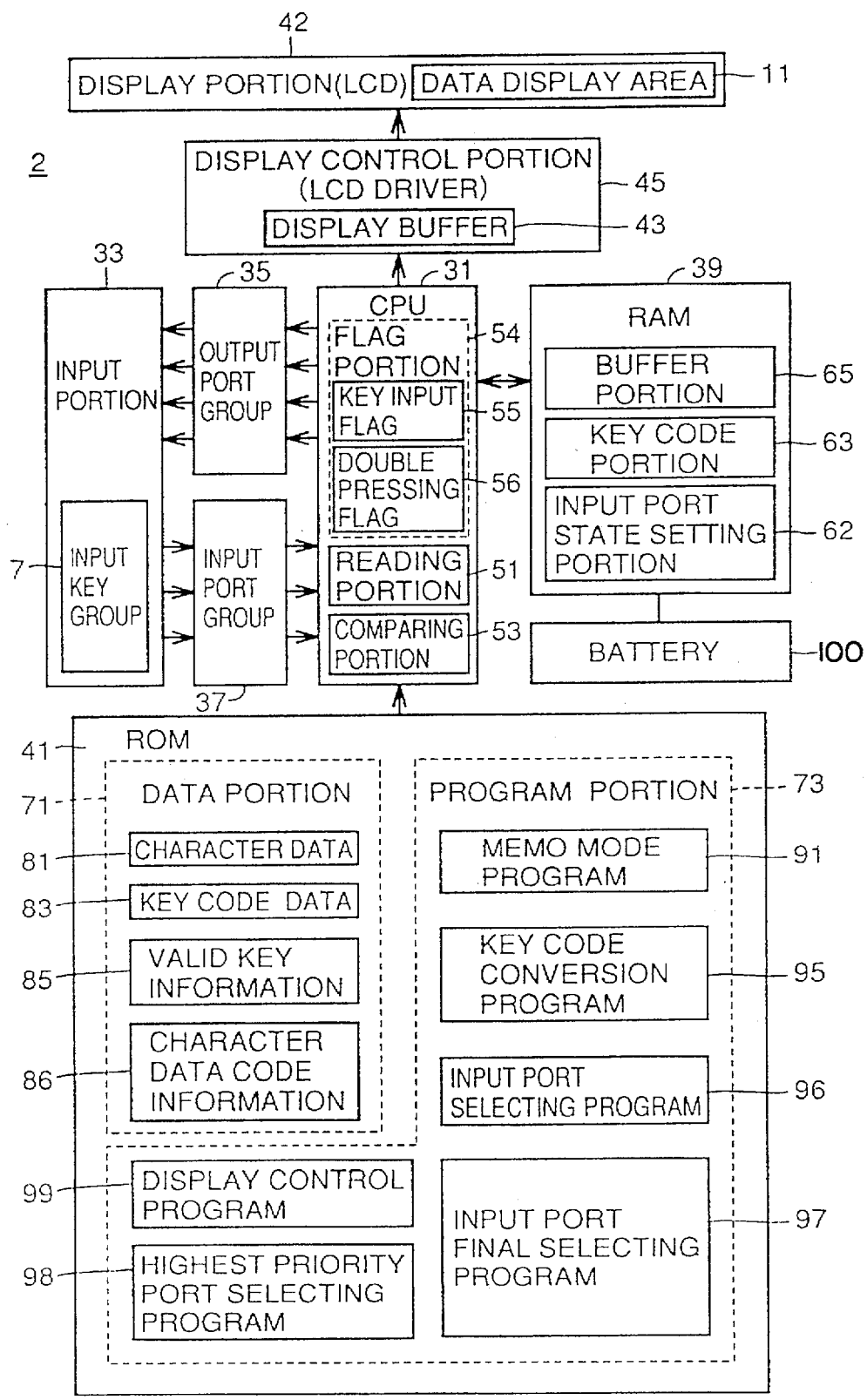
FIG. 15 shows functional structure of a portable information processing apparatus in accordance with a second embodiment of the key input apparatus of the present invention.

The second embodiment of the key input apparatus of the present invention will be described with reference to FIGS. 15 to 23. FIG. 15 is a block diagram showing a functional structure of a portable information processing apparatus (hereinafter simply referred to as an "apparatus") 2 in accordance with the second embodiment of the key input apparatus of the present invention. Portions of the apparatus 2 having similar functions as the apparatus 1 of the first embodiment are denoted by the same reference characters and referred to by the same names. Therefore, detailed description thereof is not repeated.

Portions of the apparatus 2 which are different from the apparatus 1 only will be described. CPU 31 includes, in addition to the reading portion 51 and comparing portion 53, a flag portion 54. Flag portion 54 includes a key input flag 55 and a double pressing flag 56. Use of these flags will be described later.

The RAM 39 of apparatus 2 includes, in place of input key code setting portion 61, an input port state setting portion 62. Input port state setting portion 62 is a storage area for setting state of signal input from each of the input ports of input port group 37 read by CPU 31.

Further, program portion 73 of ROM 41 of apparatus 2 includes, in place of key code converting program 92, input key code setting program 93 and key code selecting program 94 of apparatus 1, a key code converting program 95, an input port selecting program 96, an input port final selecting program 97 and a highest priority port selecting program 98. Processings of respective programs will be described later.

Figure 16:
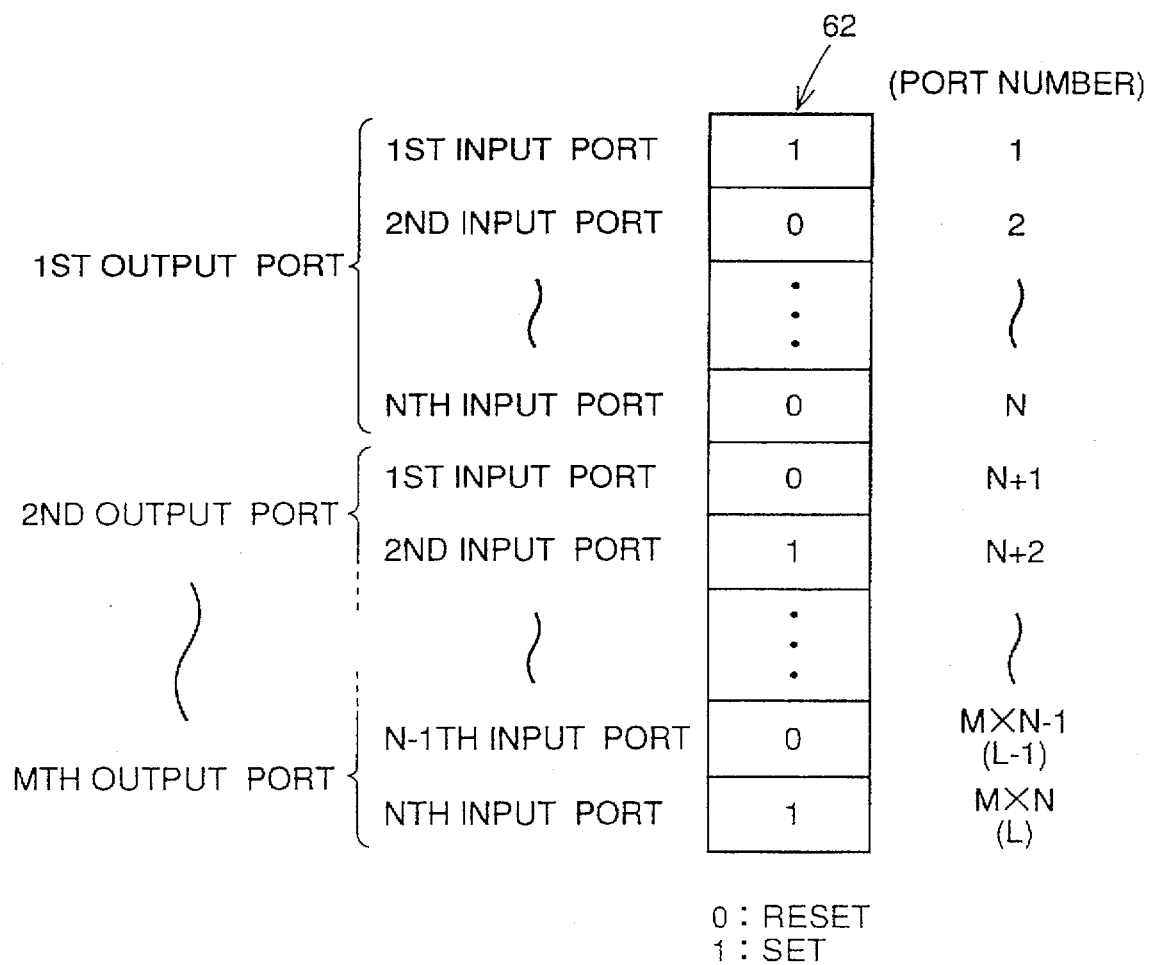
FIG. 16 is an illustration showing an example of set states of an input port state setting portion.

FIG. 16 is an illustration showing an example of set states of data at respective input ports of input port state setting portion 62. In this embodiment, data indicative of whether a signal from an input port has been detected or not is stored for each of the combinations of output and input ports, and the data are compared with each other to select the key having highest priority. At this time, input port state setting portion 62 stores the data corresponding to respective combinations of the output and input ports.

Input port state setting portion 62 stores data indicative of whether there is an input from the first to Mth input ports 131 to 135 for each of the first to Nth output ports 121 to 127. If "1" is stored, it means that there is an input signal corresponding to the combination of the output port and the input port corresponding to that address, and that the corresponding key has been pressed. This state is referred to as a set state. If "0" is stored, it means that there is no input signal corresponding to the combination of the output port and the input port corresponding to that address, and that the corresponding key has not been pressed. This state is referred to as a reset state. Input port state setting portion 62 includes addresses corresponding to all of the M×N=L keys, and stores "1" (set) or "0" (reset) in each address.

The processings in the apparatus 2 of the second embodiment will be described with reference to FIGS. 17 to 23. Operation during executing memo mode will be described as an example also in this second embodiment. The flow of the main processing in the memo mode is the same as that of FIG. 8, and therefore description is not repeated.

Figure 17:
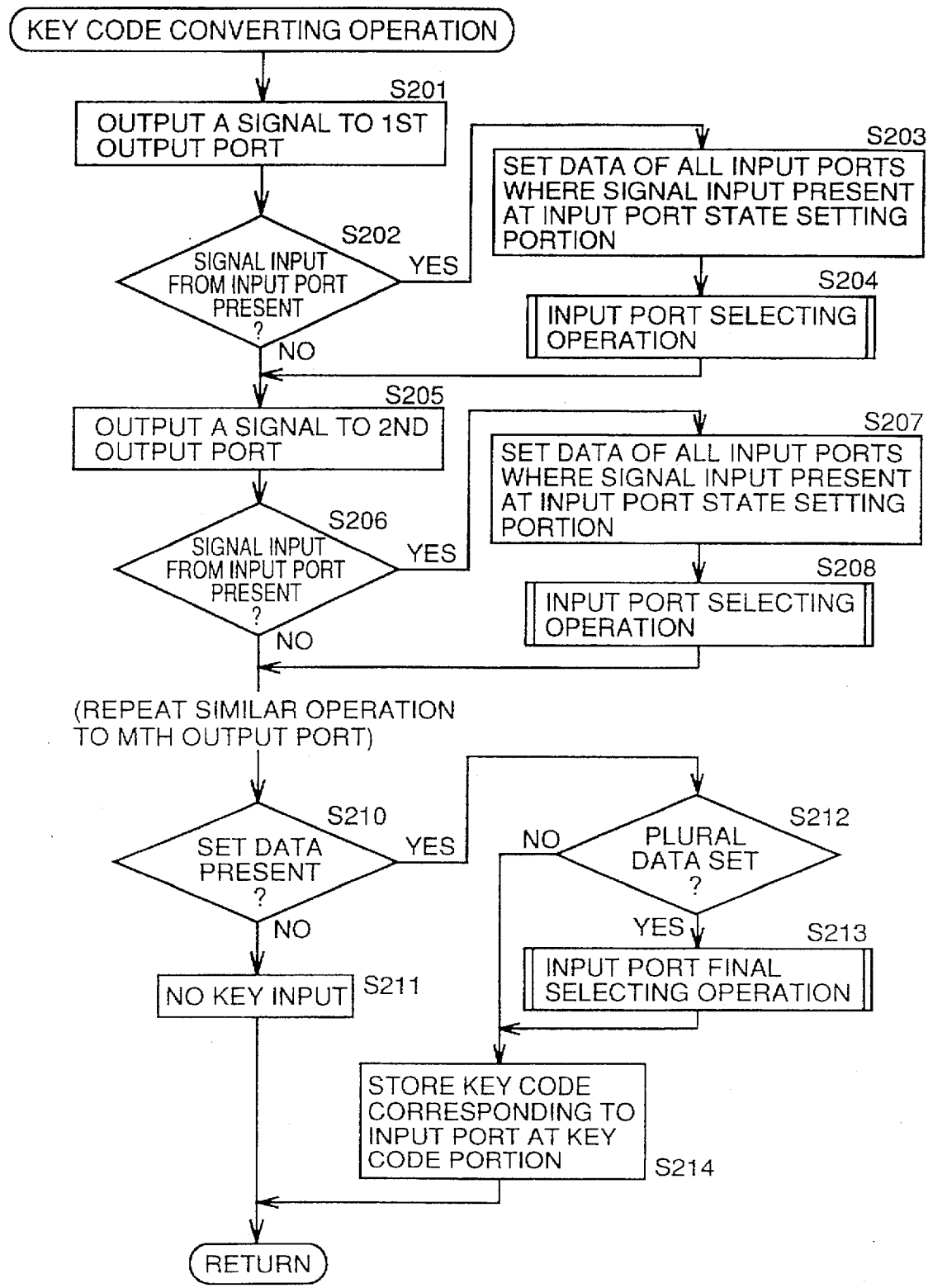
FIG. 17 is a flow chart showing the process of key code converting operation in the second embodiment.

FIG. 17 is a flow chart showing the processing of key code converting program 95 of apparatus 2. The flow of this figure is a modification of the flow of FIG. 10. When key code converting program 95 is activated, CPU 31 provides a signal to the first output port 121 (S201). CPU 31 determines whether or not there is an input signal from any of the first to Nth input ports 131 to 135 (S202). If there is an input signal from any of the input ports (YES in S202), CPU 31 writes "1" at addresses corresponding to combinations between the first output port and all the input ports to which there are input signals in input port state setting portion 62, thus realizing set state (S203). Meanwhile, data of each address of input port state setting portion 62 is reset in advance immediately after activation of key converting program 95.

Thereafter, CPU 31 performs input port selecting operation (S204). In the input port selecting operation, CPU 31 detects whether or not there is a signal input from each of the input ports included in input port group 37, and if there are signal inputs from a plurality of input ports, one of the plurality of input ports is selected in accordance with the priority. The details will be described later with reference to FIG. 18. When input port selecting operation is completed, the flow returns to S205, in which CPU 31 performs operations related to the second output port. Meanwhile, if there is no input signal from any of the input ports In S202 (NO in S202), CPU 31 directly proceeds to the operation of S205. CPU 31 outputs a signal to the second output port (S205). CPU 31 determines whether or not there is an input signal from any of the input ports (S206). As in the case of the first output port, CPU 31 writes "1" to addresses corresponding to the combinations of the second output port and all the input ports at which there are input signals in input port state setting portion 62, so as to realize set state (S207). Thereafter, CPU 31 performs input port selecting operation with respect to the second output port (S208). Meanwhile, when there is no input signal from any of the input port when a signal is output to the second output port (NO in S206), CPU 31 directly proceeds to the next operation.

CPU 31 successively repeats the operations from steps S201 to S204 or from S205 to S208 for the third to Mth output ports. When operation for all the output ports are completed, CPU 31 refers to the set state of input port state setting portion 62, and determines whether or not there is a set state data (S210). Here, if there is not "1" (set) stored in any of the addresses corresponding to the combinations of the output ports and input ports in input port state setting portion 62 (NO in S210), CPU 31 determines that there has not been a key input (S211), and terminates the program.

Meanwhile, if there is data of "1" (set) in any of the addresses in input port state setting portion 62 (YES in S210), then CPU 31 determines whether or not there is a double pressing of key inputs, that is, whether or not there are a plurality of addresses which are set (S212). If there are a plurality of addresses which are set (YES in S212), CPU 31 activates input port final selecting operation program 97, and carries input port final selecting operation (S213).

The input port final selecting operation is for selecting a key having highest priority, when "1" is set at a plurality of addresses in input port state setting portion 62 at this time point, by selecting a combination of any of the output and input ports in accordance with the priority. Details of the input port final selecting operation will be described later with reference to FIG. 20.

When input port final selecting operation is completed, CPU 31 stores a key code corresponding to the selected combination of the output and input ports to key code portion 63 (S214).

Meanwhile, if only one address is set in input port state setting portion 62 in S212 (NO in S212), CPU 31 stores the key code corresponding to the combination of the output port and input port corresponding to that address to key code portion 63, in step S214. When storage of the key code in key code portion 63 is completed, CPU 31 terminates the program.

Figure 18:
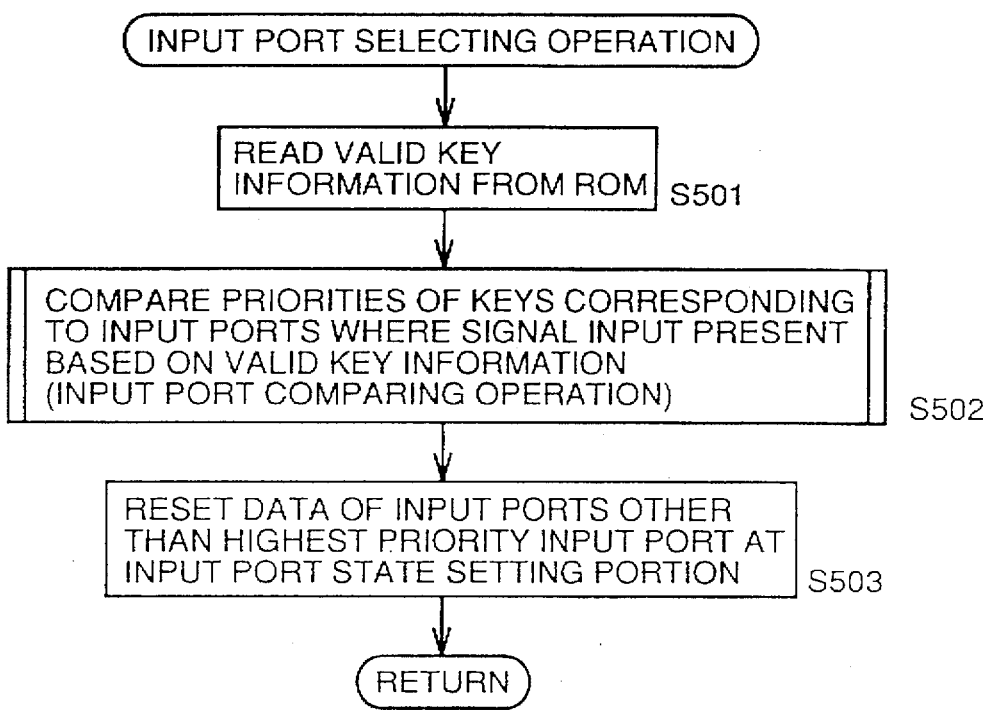
FIG. 18 is a flow chart showing the processing in an input port selecting operation.

FIG. 18 is a flow chart showing the processing of input port selecting operation. The processing shown in this figure is details of the steps S204 and S208 of FIG. 17, and it is executed by activating input port selecting operation program 96. When input port selecting operation program is activated, CPU 31 reads valid key information 85 from data portion 71 of ROM 41 (S501). Then, CPU 31 reads all the numbers of the input ports which are set in input port state setting portion 62, and reads all the key codes corresponding to the read input port numbers with respect to the output port, referring to key code data 83. CPU 31 reads priorities of the read key codes referring to valid key information 85, and compares priorities of respective keys in comparing portion 53 (S502). This comparing operation is referred to as input port comparing operation. When input port comparing operation is completed, CPU 31 resets the data of the ports except the input port of highest priority (S503).

Figure 19:
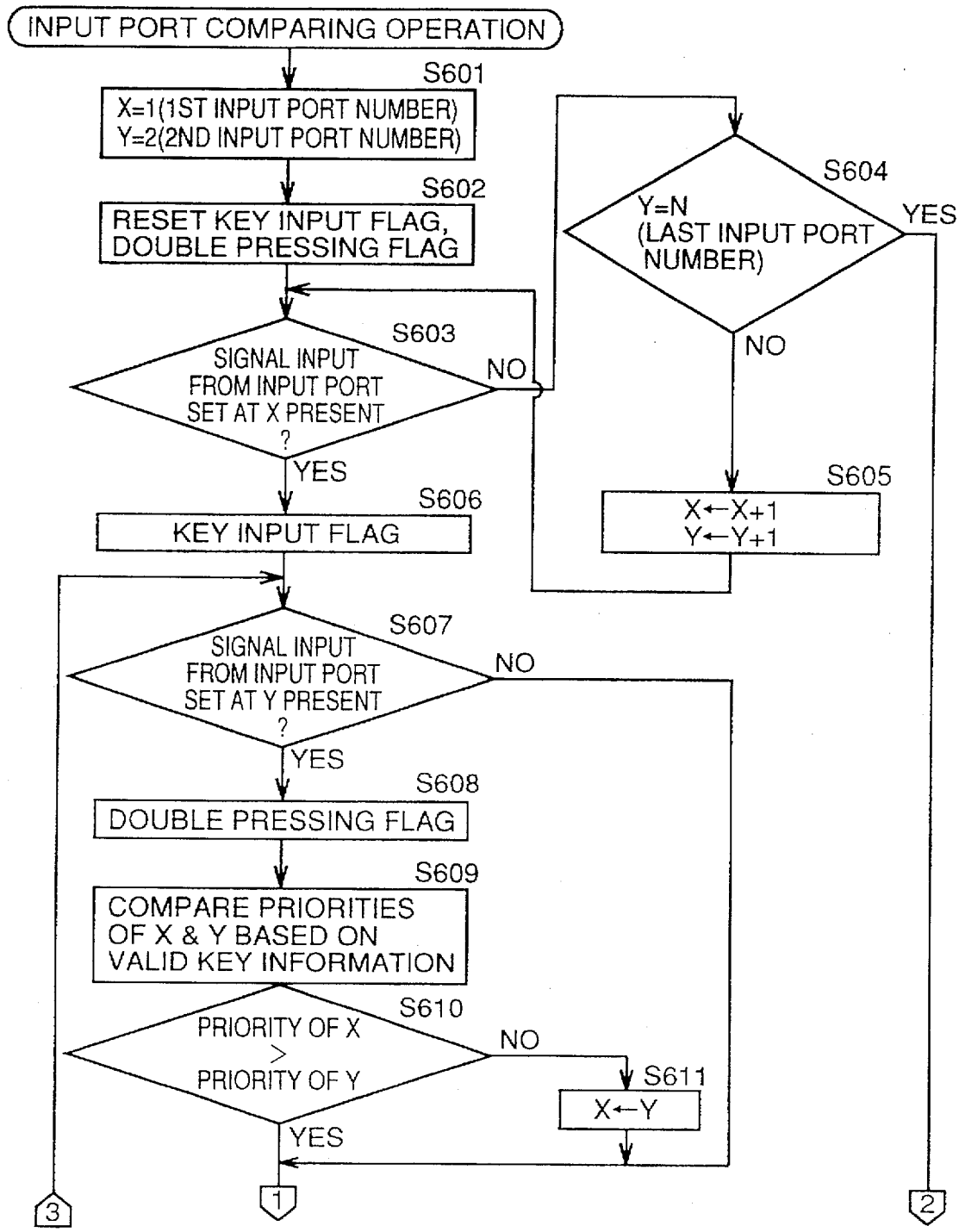
FIG. 19 is a flow chart showing the processing in an input port comparing operation.
Figure 20:
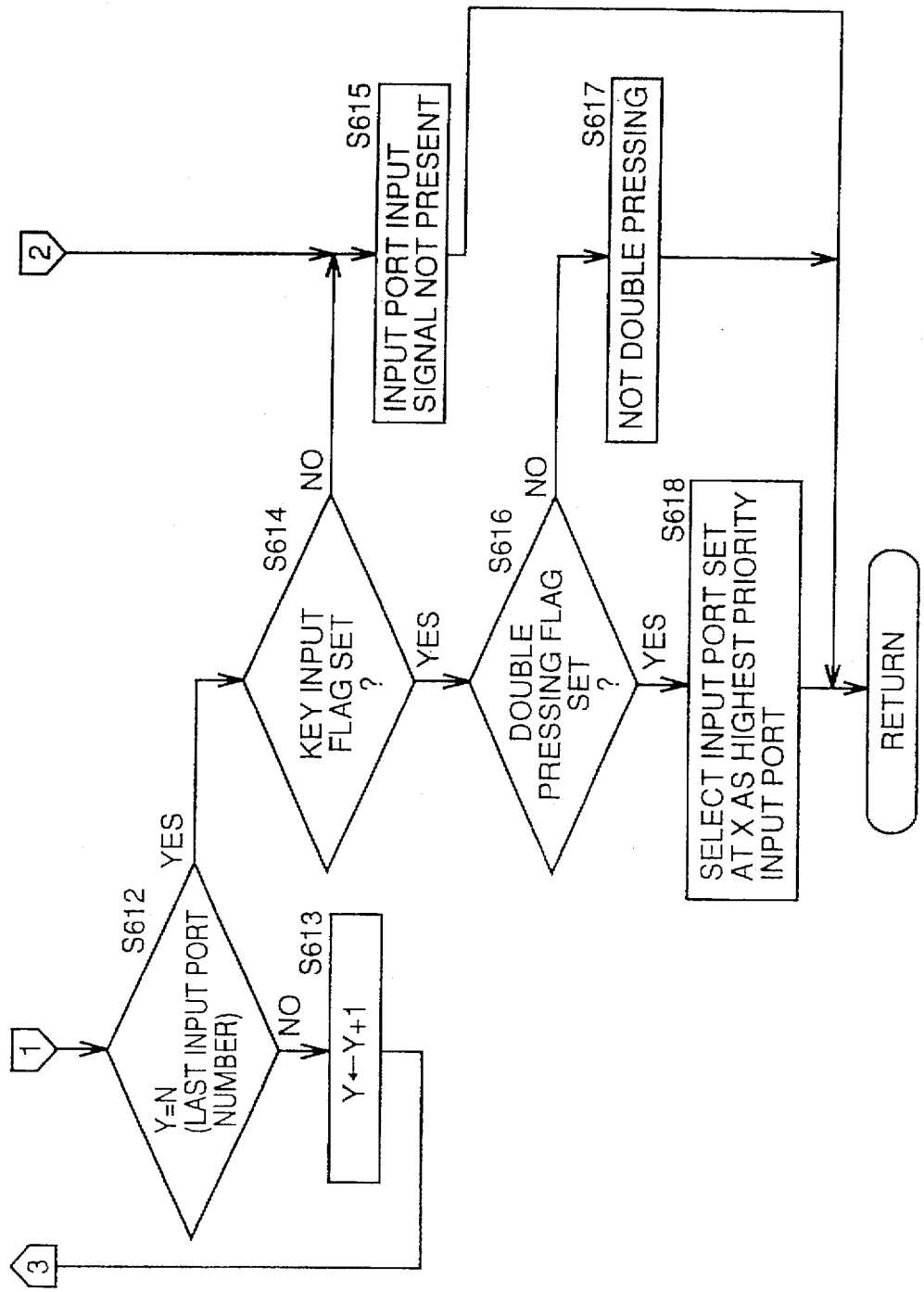
FIG. 20 is a flow chart showing the processing in an input port comparing operation.

FIGS. 19 and 20 are flow charts showing the processing of input port comparing operation. The processing shown in the figure is details of the step S502 of FIG. 18, which is executed by input port selecting operation program. When input port comparing operation is started, CPU 31 sets input port numbers 1 and 2 at variables X and Y (S601). Then, CPU 31 resets key input flag 55 and double pressing flag 56 of flag portion 54 (see FIG. 15) (S602).

Thereafter, CPU 31 determines whether or not there is an input signal from the input port indicated by the variable X (S603). When there is an input signal from the input port indicated by variable X (YES in S603), CPU 31 sets key input flag 55 (S606). Thereafter, CPU 31 determines whether or not there is an input signal from an input port indicated by variable Y (S607). If there is an input signal from the input port indicated by variable Y (YES in S607), CPU 31 sets double pressing flag 56 (S608).

Then, CPU 31 finds key codes corresponding to the input port indicated by the variable X and the input port indicated by the variable Y from key code 83, and compares priorities of the keys of respective key codes by referring to the valid key information 85 (S609). If the priority of the input port indicated by variable X is not larger than the priority of the input port indicated by variable Y (NO in S610), CPU 31 substitutes the input port number indicated by variable Y for the variable X (S611). If the priority of the input port indicated by the variable X is larger than the priority of the input port indicated by the variable Y (YES in S610), CPU 31 directly proceeds to the next operation.

Then, CPU 31 determines whether or not the input port indicated by the variable Y is the last input port (S612). If the input port indicated by the variable Y is not the last input port (NO in S612), CPU 31 increments by one the variable Y (S613), and the flow returns to S607. Thereafter, similar processes are repeated.

Meanwhile, if there is no input signal from the input port indicated by the variable X in S603 (NO in S603), CPU 31 determines whether or not the variable Y is the last input port number (S604). If the variable Y is not the last input port number (NO in S604), CPU 31 increments by one the variables X and Y, respectively (S605), and the flow returns to the step S603.

If the variable Y is equal to the number of the last input port in S612 (YES in S612), CPU 31 determines whether or not key input flag 55 has been set (S614). If key input flag has been set (YES in S614), CPU 31 determines whether or not double pressing flag 56 has been set (S616). If double pressing flag 56 has been set (YES in S616), CPU 31 selects the input port indicated by the variable X at that time as the input port of highest priority S618, and terminates the program.

If the variable Y is the last input port number in S604 (YES in S604) or when key input flag 55 is not set in step S614 (NO in S614), CPU 31 determines that there is no input signal from any of the input ports (S615), and terminates the program.

If double pressing flag 56 is not set in S616 (No in S616), CPU 31 determines that it is not double pressing (S614), and terminates the program. In that case, data of any one input port of the input ports corresponding to one output port is set in input port state setting portion 62, and therefore it is not necessary to reset other data in step S503 shown in FIG. 18.

Figure 21:
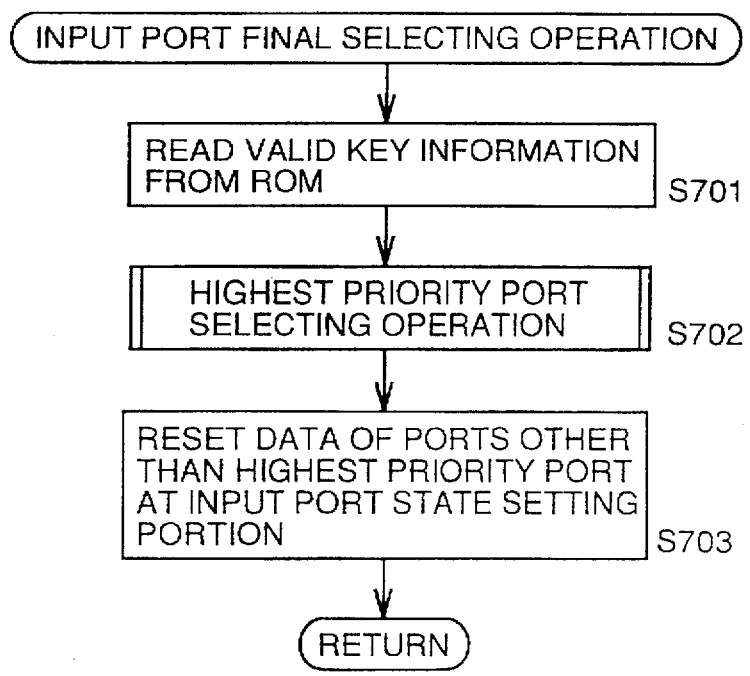
FIG. 21 is a flow chart showing the processing of an input port final selecting operation.

FIG. 21 is a flow chart showing the processing of input port final selecting operation. The processing shown in the figure is the details of the step S213 of FIG. 17, and it is executed by activating input port final selecting operation program 97. When input port final selecting operation starts, CPU 31 reads valid key information 85 from data portion 71 of ROM 41 to reading portion 51 (S701).

Then, CPU 31 performs highest priority port selecting operation (S702). In highest priority port selecting operation, of a plurality of combinations of output and input ports which are at the set state in input port state setting portion 62 at this time point, a combination of highest priority is selected, and the key having the highest priority corresponding to that combination is determined. Details of the highest priority port selecting operation will be described later with reference to FIG. 22. Then, CPU 31 resets the data of addresses corresponding to combinations other than the combination selected as the one having the highest priority (S703), and terminates the program.

Figure 22:
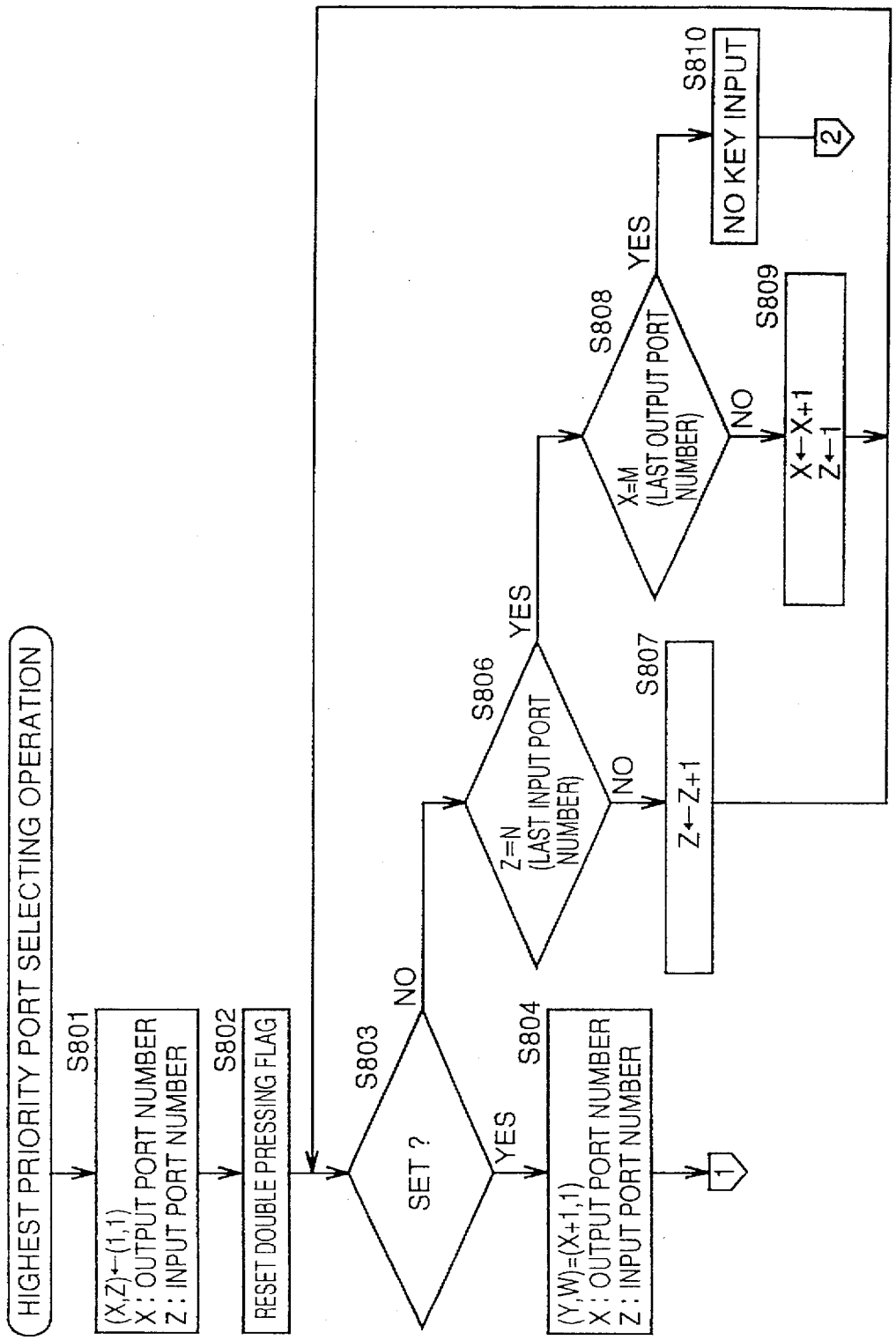
FIG. 22 is a flow chart showing the processing of a highest priority port selecting operation.
Figure 23:
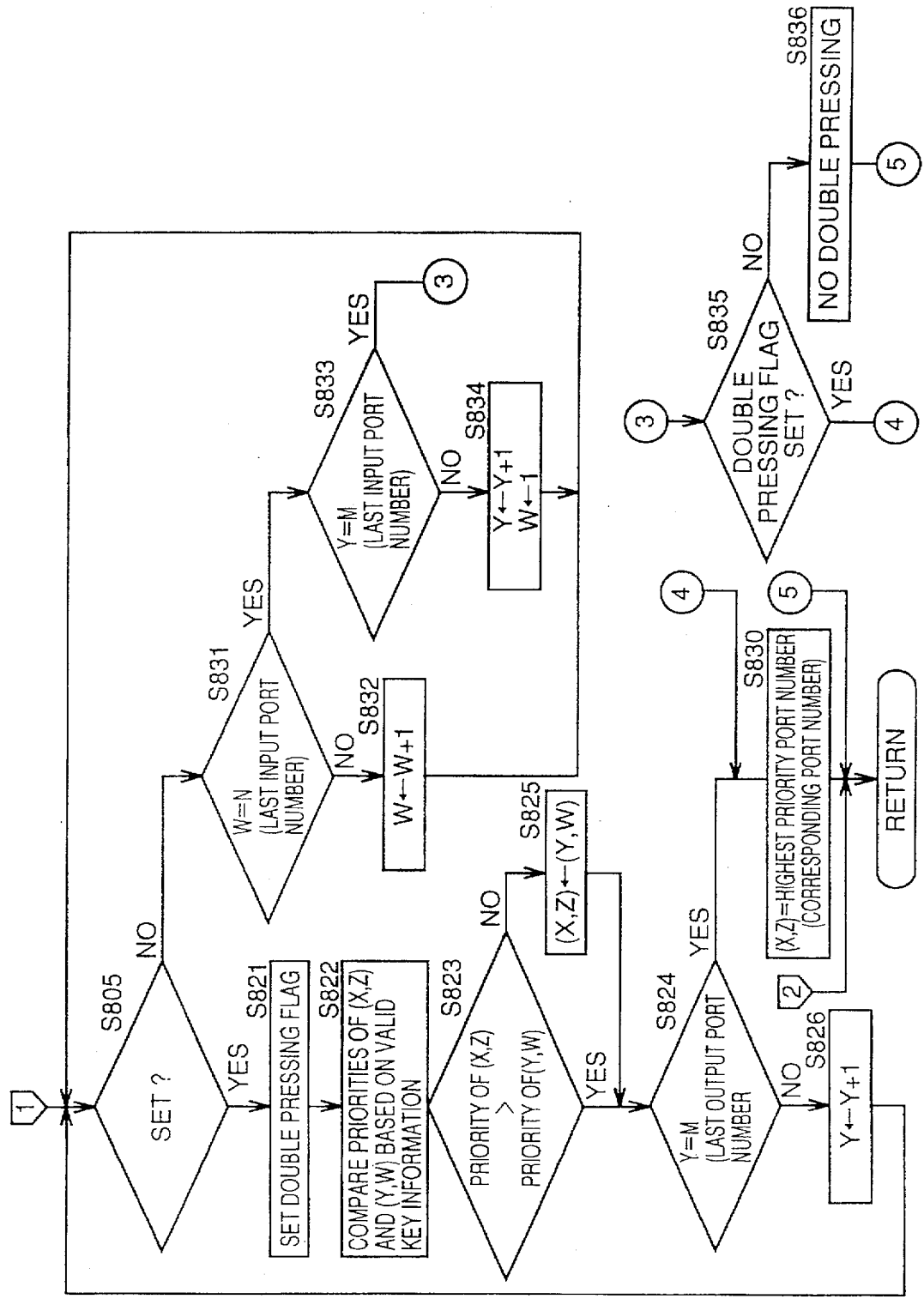
FIG. 23 is a flow chart showing the processing in the highest priority port selecting operation.

FIG. 22 is a flow chart showing the processing of highest priority port selecting operation. The processing shown in this figure is the details of the step S702 shown in FIG. 21, and it is executed by activating highest priority port selecting operation program 98. When highest priority port selecting operation starts, CPU 31 sets an output port number at a variable X of a two dimensional array variable (X, Z), and set an input port number 1 at variable Z (S801).

Then, CPU 31 resets double pressing flag 56 (S802). Thereafter, CPU 31 determines whether or not the address corresponding to the combination of the output and input ports indicated by the array variable (X, Z) is set (S803). If the data of (X, Z) is at the set state (YES in S803), CPU 31 sets the next combination of the output and input ports at two dimensional array variable (Y, W) (S804). More specifically, variable Y is substituted for X+1, and input port number 1 is set in variable W. Then, CPU 31 determines whether or not the data of the address corresponding to the combination of the output and input ports indicated by (Y, W) is at the set state (S805).

If the data corresponding to (X, Z) is not set in S803 (NO in S803), CPU 31 determines whether or not the variable Z is equal to the last input port number (S806). If the variable Z is not equal to the last input port number (NO in S806), CPU 31 increments the variable Z by 1 (S807), and the flow returns to the process of step S803.

If the variable Z is equal to the last number (YES in S806), CPU 31 then determines whether or not the variable X is equal to the last output port number (S808). If the variable X is not equal to the last output port number (NO in S808), CPU 31 increments variable X by 1, sets 1 in variable Z (S809), and then returns to the step S803.

If the variable X is the last number (YES in S808), CPU 31 determines that there is no key input operation (S809), and terminates the program.

If the data corresponding to the combination of the output and input ports indicated by (Y, W) is at the set state in S805

(YES in S805), CPU 31 sets double pressing flag 56 (S821). Thereafter, CPU 31 refers to valid key information 85, and compares priorities of the key code corresponding to (X, Z) and (Y, W) (S822).

If the priority of (X, Z) is higher than that of (Y, W) (YES in S823), CPU 31 determines whether or not the variable Y is equal to the last output port number (S824). If the priority of (X, Z) is not higher than that of (Y, W) (NO in S823), CPU 31 sets the combination of the output and input ports set in (Y, W) to (X, Z) (S825), and performs the operation of step S824.

When the variable Y is not equal to the last output port number in S824 (NO in S824), CPU 31 increments the variable Y by 1 (S826), and returns to the operation of the step S825. If the variable Y is equal to the last output port number (YES in S824), CPU 31 selects the combination of the output and input ports indicated by (X, Z) at that time point as the combination number of the ports of highest priority (S830), and terminates the program.

Further, if the data of (Y, W) is not set in S805 (NO in S805), CPU 31 determines whether or not the variable W is equal to the last input port number (S831). If the variable W is not equal to the last input port number (NO in S831), CPU 31 increments the variable W by 1 (S832), and the flow returns to the step S805.

When the variable W is equal to the last input port number (YES in S831), CPU 31 determines whether or not the variable Y is equal to the last output port number (S833). If the variable Y is not equal to the last output port number (NO in S833), CPU 31 increments the variable Y by 1, sets 1 to variable W (S834), and the flow returns to S805. If the variable Y is equal to the last output port number (YES in S833), CPU 31 determines whether or not double pressing flag 56 is set (S835).

If double pressing flag 56 is not set (NO in S835), CPU 31 determines that there is not a double pressing (S836), and terminates the program. In that case, the data of only one input port among respective input port corresponding to one of the respective output ports in input port state setting portion 62, it is not necessary to reset other data in step S703 of FIG. 21. If double pressing flag 56 is set (YES in S835), CPU 31 proceeds to the step S830 in which the number of the combination of the output and input ports set at (X, Z) at that time point is selected as the combination number of the ports of highest priority, and the program terminates.

As described above, according to the present invention, when two or more keys are pressed simultaneously in a keyboard including a plurality of keys, one of the two or more keys which are pressed is selected as the pressed key referring to priorities of the keys which are determined in advance. Therefore, even when two or more keys are pressed simultaneously, the processing can be done assuming that only one of the key has been pressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A key input apparatus, comprising:

a keyboard provided with a plurality of keys;

key input detecting means for detecting a key which is pressed among said plurality of keys;

plural key input detecting means for detecting, based on a result of detection by said key input detecting means, pressing of at least two keys simultaneously among said plurality of keys;

key priority storing means for storing predetermined priority of each of said plurality of keys;

comparing means for comparing said predetermined priority of each of said at least two keys detected by said plural key input detecting means to generate a compared result; and key selecting means for selecting one of said at least two keys as a pressed key based on said compared result;

said key input detecting means including
reading means for reading an output from each of said plurality of keys, and
data storing means for storing prescribed data in accordance with an output from said reading means, and said plural key input detecting means refers to the data stored in said data storing means, for detecting plural data being stored;

wherein the data stored in said data storing means includes a key input flag indicative of a pressed key; and said plural key input detecting means detects pressing of at least two keys of said plurality of keys, when a plurality of said key input flags are stored; and wherein said comparing means includes
key code data reading means for reading key code data corresponding to said key input flag, and
key code data selecting means for successively comparing
said priority of the key code data read by said key code data reading means, and said key selecting means selects key code data having highest priority.

2. A method for selecting a valid key input from a plurality of key inputs, comprising:

establishing priority data for each of a plurality of keys;

detecting which one of said plurality of keys has been pressed;

determining whether at least two keys have been pressed based on said detecting step;

comparing said priority data of each of said at least two keys to generate a compared result; and selecting one of said at least two keys as a valid key based on said compared result, wherein said detecting step includes,
reading an output from each of said plurality of keys,
storing prescribed data in accordance with said output read in said reading step, and
referring to the data stored in said storing step, for detecting plural data being stored, wherein the data stored in said storing step includes a key input flag indicative of a pressed key, and said determining step determines pressing of at least two keys of said plurality of keys, when a plurality of said key input flags are stored; and wherein said comparing step includes
reading key code data corresponding to said key input flag, and
successively comparing said priority of the key code data read in said reading step, and said selecting step selects key code data having highest priority.

3. A key input apparatus comprising:

a plurality of keys;

a key priority generating unit generating priority data for each of said plurality of keys;

a plural key input detecting unit detecting pressing of at least two of said plurality of keys simultaneously;

a comparing unit comparing said priority data of said at least two keys; and a selecting unit selecting one of said at least two keys based on a comparison in said comparing unit, wherein said plural key detecting unit includes,
- a reading unit reading an output from each of said plurality of keys,
- a data storing unit storing prescribed data in accordance with said output read by said reading unit, and
- a referring unit referring to the data stored in said data storing unit, said referring unit detecting plural data being stored;

wherein the data stored in said data storing unit includes a key input flag indicative of a pressed key, and said plural key input detecting unit detects pressing of at least two keys of said plurality of keys, when a plurality of said key input flags are stored, and wherein said comparing unit includes
- a key code data reading unit reading key code data corresponding to said key input flag, and a key code data selecting unit successively comparing said priority of the key code data read by said key code data reading unit, said key code data selecting unit selects key code data having highest priority.

* * * * *